United States Patent
Deyaf et al.

(10) Patent No.: US 11,312,295 B1
(45) Date of Patent: Apr. 26, 2022

(54) MULTIFUNCTION SIREN DEVICE LOCKING SYSTEM

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 17/544,469

(22) Filed: Dec. 7, 2021

(51) Int. Cl.
*G06F 17/00* (2019.01)
*B60Q 5/00* (2006.01)
*G06F 3/0484* (2022.01)

(52) U.S. Cl.
CPC ............. *B60Q 5/001* (2013.01); *B60Q 5/005* (2013.01); *G06F 3/0484* (2013.01)

(58) Field of Classification Search
CPC .......... B60Q 5/001; B60Q 5/005; B60Q 7/00; G06F 3/0484
See application file for complete search history.

(56) References Cited

U.S. PATENT DOCUMENTS

| | | | | |
|---|---|---|---|---|
| 5,296,840 A * | 3/1994 | Gieffers | ............... | B60Q 1/2611 340/474 |
| 5,557,257 A * | 9/1996 | Gieffers | ............... | B60Q 1/2611 340/474 |
| 5,612,673 A * | 3/1997 | Nunn | ....................... | G08B 3/10 340/471 |
| 8,786,423 B2 * | 7/2014 | Miller | .................... | B60Q 5/001 340/474 |
| 2012/0230504 A1 * | 9/2012 | Kuroda | ............ | G10K 11/17837 381/71.4 |
| 2012/0303212 A1 * | 11/2012 | Miller | ...................... | G08B 7/06 701/36 |
| 2013/0154821 A1 * | 6/2013 | Miller | .................. | B60Q 1/2611 340/471 |

* cited by examiner

*Primary Examiner* — An T Nguyen

(57) ABSTRACT

Examples provide a siren device having a plurality of lockable functions, such as amplifier strength and siren tone functions. At production, one or more of the available functions are placed in a locked state in which the locked function is inoperable. One or more of the functions may be initially unlocked at manufacture or purchase. The user can obtain an unlock code to unlock one or more of the functions, if desired, after purchase. Thus, if a user wants to increase the amplifier strength from one-hundred watts to two-hundred watts, the user can obtain one or more unlock codes to unlock that selected function for a licensed time-period. When unlocked, the selected function operates normally. A data storage device on the multifunction siren device stores an assigned UID, a set of available lockable functions, and a lock status of each function in the set of available functions.

20 Claims, 28 Drawing Sheets

2100

| | |
|---|---|
| | User Login |

User name [                    ]

Password  [                    ]

I am an end user that wants to upgrade my product.

| Device Connected Status "connected" ||
|---|---|
| Lock Status: | Locked |
| Activate: | Additional Function(s) |
| Select option | 200 Watt Amplifier |
| Serial Number: | XXX |

| Connected Status: Connected | | | |
|---|---|---|---|
| Function | 1A: | Locked | |
| | 1B: | Unlocked | |
| | 2A: | Unlocked | |
| | 3A: | Locked | |
| | 3B: | Locked | |
| Product Info: | Type | Name | Category |
| UID: | XXX-XXX-XXX | | |
| Production Date: | colspan 01/01/2021 | | |
| History Log: | Date | Activity | |
| | Date | Activity | |
| | Date | Activity | |

| Selected Amplifier Functions: | | | |
|---|---|---|---|
| 100 Watt | 200 Watt | 300Watt | 400 Watt |

Selected Siren Tone:                                          A1

| Demo mode | Select to test configuration |
|---|---|

License Date: | Time period |

Your cost: | Amount |

| Pay Now |

Siren: Connected

Siren Tone:    Wail    Horn    Yelp

200 Watt Amplifier:

Try Now

Device must remain connected during demonstration.

| Unlock Features | |
|---|---|
| 200w Amplifier | Amount |
| Siren Tone-Wail | Amount |
| Siren Tone-Horn | Amount |
| Public Address | Amount |

Your Code is: | XXX-XXX

Unlock Now    Click here

*FIG. 27*

MULTIFUNCTION SIREN DEVICE LOCKING SYSTEM

BACKGROUND

A siren device for emergency vehicles is a device that emits an audible sound or tone to warn pedestrians and other drivers that an emergency vehicle is in the vicinity. The variations in the pitch of the sound can indicate a direction of approach of the emergency vehicle. In other words, the pitch can assist a listener in determining the direction from which an emergency vehicle is approaching. Siren devices typically come in a variety of wattage types, such as, but not limited to, sirens having a one-hundred-watt (100 w) amplifier, sirens having a two-hundred-watt (200 w) amplifier, as well as four-hundred-watt (400 w) amplifiers. The 100 w siren devices have limited functionality and range as compared to the 200 w or higher siren devices. Manufacturers and/or dealers frequently are required to stock 100 w devices as well as higher wattage devices, such as 200 w and 400 w siren devices to accommodate customers that may prefer the more economical 100 w devices, as well as those customers desiring the more functional higher wattage devices. However, it can be inefficient for manufacturers to produce multiple different types of siren devices, burdensome to manage multiple different stock keeping units (SKUs) and cost prohibitive for manufacturers and/or dealers to stock large numbers of types of devices.

SUMMARY

Some examples provide a system and method for emergency vehicle siren devices with lockable functions. A siren device includes a plurality of available functions, including amplifier strength and/or siren tone functions. The amplifier strength function includes a low wattage amplifier function and one or more higher wattage amplifier functions. The plurality of available functions are lockable such that the device is provided to a user with one or more of the available functions in a locked configuration. A locked function is inoperable until the function is unlocked. A data storage device stores a lock status of each function. The siren device communicatively couples with a user device to obtain an unlock code unlocking one or more of the locked functions. When an unlock code is received for a given function, the siren device unlocks that function and changes the lock status of that function from the locked state to an unlocked state. The functions are configurable such that users can customize the amplifier function and siren tones emitted by the siren device.

This Summary is provided to introduce a selection of concepts in a simplified form that are further described below in the Detailed Description. This Summary is not intended to identify key functions or essential functions of the claimed subject matter, nor is it intended to be used as an aid in determining the scope of the claimed subject matter.

BRIEF DESCRIPTION OF THE DRAWINGS

FIG. 21 is an exemplary screenshot illustrating a user login screen.

FIG. 22 is an exemplary screenshot illustrating a device status page.

FIG. 23 is an exemplary screenshot illustrating a device status page showing lock status and history data.

FIG. 24 is an exemplary screenshot illustrating a configuration page.

FIG. 25 is an exemplary screenshot illustrating a demonstration mode page.

FIG. 26 is an exemplary screenshot illustrating a configuration page for unlocking one or more functions on a siren device.

FIG. 27 is an exemplary screenshot illustrating a confirmation page for completing licensing of a locked function on a siren device.

DETAILED DESCRIPTION

Figure 1:
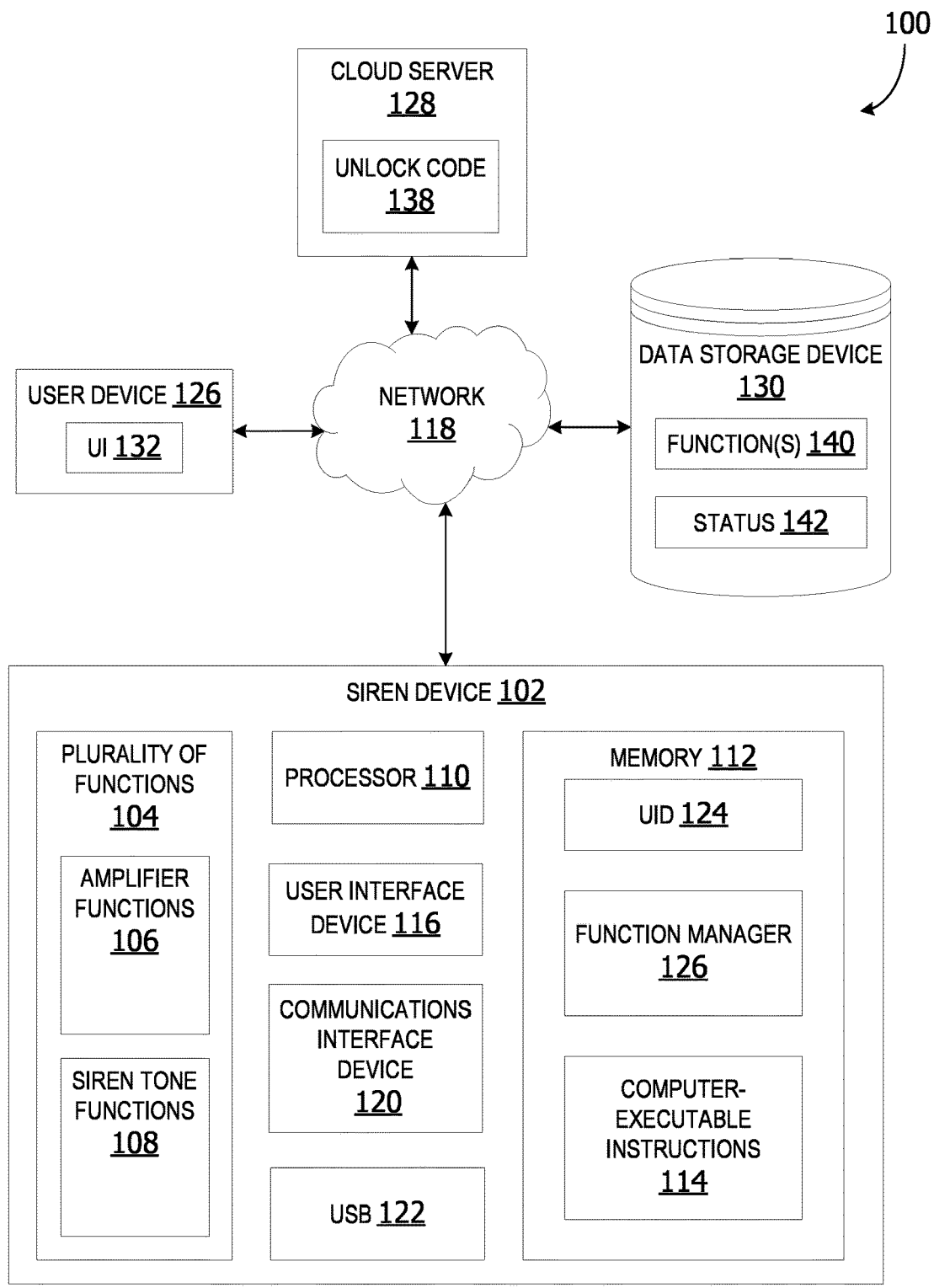
FIG. 1 is an exemplary block diagram illustrating a system for providing lockable functions on a siren device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

There are many different types and varieties of emergency vehicle siren devices. Some sirens have one-hundred-watt (100 w) amplifiers while other siren devices have two-hundred-watt (200 w) amplifiers. Other siren devices can have amplifiers with wattages up to four-hundred-watts (400 w). The higher wattage devices, such as the 200 w siren devices, are typically capable of greater volume, range, and output power than the lower wattage 100 w sirens. Likewise, sirens are frequently capable of emitting a wide variety of siren tones. Various siren tones include wail, yelp, air horn, etc. Siren devices can also include a public address (PA) system function, noise cancelation, and/or radio rebroadcast functions. Siren devices having the amplifiers greater than the 100 w amplifier, additional siren tones and functions are more expensive to manufacture and obtain than 100 w sirens with fewer functions and options available. However, it can be inefficient to produce and stock multiple different types of siren devices.

Referring to the figures, examples of the disclosure enable a multifunction siren device having lockable functions. The lockable functions enable a siren device to be sold or otherwise provided to a user with one or more of the functions locked. In this manner, a lockable siren device capable of operating as a 200 w amplifier to function as a siren with a limited 100 w amplifier. The siren device can also be provided to the user with all functions initially locked enabling each user to customize the siren device functions such that one user can unlock the 100 w amplifier and another user can unlock the 200 w amplifier function.

In some examples, functions such as amplifier strength functions and siren tone functions are locked at manufacture time and/or prior to delivery to a user. The user can purchase the siren device for the lower costs associated with a siren device having limited functionality while receiving a device capable of performing a plurality of additional functions if unlocked. The user is enabled to customize siren device functions based on the user's unique circumstances, preferences, and budget constraints. This enables increased flexibility with regard to available functionality of the siren device while improving affordability and customization for users.

Aspects of the disclosure further enable lockable functions on multifunction siren devices such that one or more functions can be locked to enable the 200 w multifunction siren device to function as a 100 w siren device. In this manner, a more expensive 200 w multifunction siren device or 400 w multifunction siren device can be made available to users for the lower cost of a 100 w siren device. This enables manufacturers and dealers to stock a single type of device while ensuring customers have the maximum range of functionality and customization available. This simplifies inventory requirements by enabling removal of 100 w siren devices from inventory without reducing sales volume or inconveniencing customers preferring more economical 100 w siren device.

In still other examples, a user can lock and unlock functions on the multifunction siren device to suit the user's changing circumstances. For example, if a user initially purchases the device with a 100 w amplifier unlocked and later wants to expand functionality to include the 200 w amplifier or other additional siren tone functions, the user can reconfigure the device to unlock the additional functions as desired and when convenient for the user. This enables improved flexibility and additional user control over device functions.

The siren device in other aspects is upgraded or downgraded from the 100 w device to the 200 w device, 300 w device or 400 w device without removal or replacement of the original device or device parts. This reduces maintenance and replacement costs associated with purchasing a new unit-replacing a single function 100 w siren device with a more powerful higher wattage siren device. In this manner, the user can upgrade the lower-cost 100 w siren device to a higher wattage siren device without replacing or removing the original siren device. This reduces user time and expense associated with upgrading the device.

The multifunction siren device operates in an unconventional manner by utilizing one or more software component to enable configurable functionality by providing lockable functions on the siren device which can be unlocked by the dealer or end-user after purchase, delivery, or installation. In this manner, the multifunction siren device is used in an unconventional way by locking functions to reduce initial device purchase costs for consumers while enabling the flexibility of unlocking additional functions via licensing to obtain unlock code(s) as desired by the consumer.

Referring again to FIG. 1, an exemplary block diagram illustrates a system 100 for providing lockable functions on a multifunction siren device 102. In the example of FIG. 1, the multifunction siren device 102 is a siren device capable of being attached or installed on an emergency vehicle, such as, but not limited to, an ambulance, fire truck, police car, tow truck, search and rescue vehicle, police motorcycle, or any other type of emergency vehicle. The multifunction siren device 102 includes exterior surface mount siren devices mounted to an exterior surface of a vehicle, as well as hand-held devices and interior mount siren device located within an interior of the vehicle.

The multifunction siren device 102 is a siren device capable of performing a plurality of available functions 104. In some examples, the multifunction siren device 102 includes one or more amplifier devices providing two or more different amplifier functions 106. In this example, the amplifier functions 106 include a 100 w amplifier function and a 200 w amplifier function. In other examples, the amplifier functions 106 include 100 w amplifier function, 200 w amplifier function and a 300 w amplifier function. In still other examples, the amplifier functions include 100 w amplifier function, 200 w amplifier function, a 300 w amplifier function and a 400 w amplifier function.

In still other examples, the multifunction siren device 102 is capable of two or more different siren tone functions 108. The siren tone functions 108 include varying sound, volume, pitch, tone, and other features providing a different siren sound emitted from the multifunction siren device 102. In this non-limiting example, the siren tone functions include wail, yelp, and air horn. Other siren tones can optionally include phaser, pneumatic horn, or any other available siren sound. The siren device can alternatively provide additional lockable functions such as, but not limited to, a noise cancellation function, radio rebroadcast function, public address (PA), or other functions. A PA function is a bull-horn type of function which amplifies a user's voice to a louder volume which can be heard across greater distances, in a loud environment or other situations.

One or more of the functions can be locked at manufacture time, such that the siren device is incapable of emitting any of the locked siren tones or operating as a locked 200 w amplifier function until the locked functions are unlocked. In some examples, all functions are initially locked by default at manufacture time. In these examples, the siren device is incapable of functioning until at least one locked function is unlocked. In this manner, the dealer and/or user can select whether to unlock 100 w amplifier or 200 w amplifier prior to releasing the siren device to the user. Thus, the device is shipped to the dealer and/or end-user in a completely locked (de-activated) state. If the user prefers the 100 w amplifier option, the end-user or dealer licensing the 100 w amplifier feature selects the 100 w amplifier function from the available two or more lockable functions on the multifunction siren device for unlocking. Thus, a first user may choose to unlock the 100 w amplifier on a first siren device and another user can choose to unlock the 200 w amplifier on a second multifunction siren device. Still another user can choose to unlock the 200 w amplifier with multiple siren tones. This enables greater customization and configurability.

In other examples, the 100 w amplifier is unlocked (operable) at manufacture time. In this example, every siren device is initially activated to operate as a 100 w siren device unless the user chooses to license/unlock the 200 w amplifier function.

In some examples, all siren tones are initially locked such that the siren device is inoperable to emit any siren tone until at least one siren tone is unlocked by a dealer or end-user. This enables the dealer or end-user to select which siren tone is initially unlocked. In other examples, at least one default siren tone is initially unlocked at the time of manufacture or device initialization, prior to shipping/releasing the device to the dealer/end-user. This enables the siren device to function with one or more basic siren tones upon receipt by the user. The user can then choose to unlock additional siren tones or other functions.

In some examples, the multifunction siren device 102 is capable of executing computer-executable instructions 114 (e.g., as application programs, operating system functionality, or both) to implement the operations and functionality associated with the multifunction siren device 102. In some examples, the multifunction siren device 102 has at least one processor 110 and a memory 112. The multifunction siren device 102 optionally includes a user interface device 116.

The processor 110 includes any quantity of processing units and is programmed to execute the computer-executable instructions 114. The computer-executable instructions 114 is performed by the processor 110, performed by multiple processors within the multifunction siren device 102 or performed by a processor external to the multifunction siren device 102. In some examples, the processor 110 is programmed to execute instructions such as those illustrated in the figures (e.g., FIG. 16, FIG. 17, FIG. 18, FIG. 19, and FIG. 20).

The multifunction siren device 102 further has one or more computer-readable media such as the memory 112. The memory 112 includes any quantity of media associated with or accessible by the multifunction siren device 102. The memory 112, in these examples, is internal to the multifunction siren device 102 (as shown in FIG. 1). In other examples, the memory 112 is external to the computing device (not shown) or both (not shown).

The memory 112 stores data, such as one or more applications. The applications, when executed by the processor 110, operate to perform functionality on the multifunction siren device 102. The applications can communicate with counterpart applications or services such as web services accessible via a network 118. In an example, the applications represent downloaded client-side applications that correspond to server-side services executing in a cloud.

In other examples, the user interface device 116 includes a graphics card for displaying data to the user and receiving data from the user. The user interface device 116 can also include computer-executable instructions (e.g., a driver) for operating the graphics card. Further, the user interface device 116 can include a display (e.g., a touch screen display or natural user interface) and/or computer-executable instructions (e.g., a driver) for operating the display. The user interface device 116 can also include one or more of the following to provide data to the user or receive data from the user: speakers, a sound card, a camera, a microphone, a vibration motor, one or more accelerometers, a Bluetooth® brand communication module, global positioning system (GPS) hardware, and a photoreceptive light sensor.

The network 118 is implemented by one or more physical network components, such as, but without limitation, routers, switches, network interface cards (NICs), and other network devices. The network 118 is any type of network for enabling communications with remote computing devices, such as, but not limited to, a local area network (LAN), a subnet, a wide area network (WAN), a wireless (Wi-Fi) network, or any other type of network. In this example, the network 118 is a WAN, such as the Internet. However, in other examples, the network 118 is a local or private LAN.

In some examples, the system 100 optionally includes a communications interface device 120. The communications interface device 120 includes a network interface card and/or computer-executable instructions (e.g., a driver) for operating the network interface card. Communication between the multifunction siren device 102 and other devices, such as but not limited to a user device 126, a cloud server 128 and/or a remote data storage device 130, can occur using any protocol or mechanism over any wired or wireless connection. In some examples, the communications interface device 120 is operable with short range communication technologies such as by using near-field communication (NFC) tags.

The user device 126 represents any device executing computer-executable instructions. The user device 126 can be implemented as a mobile computing device, such as, but not limited to, a wearable computing device, a mobile telephone, laptop, tablet, computing pad, netbook, gaming device, and/or any other portable device. The user device 126 includes at least one processor and a memory. The user device 126 can also include a user interface 132 device. In some examples, the user device 126 connects to the multifunction siren device 102 via a universal serial bus (USB) 122 port on the multifunction siren device 102.

The cloud server 128 is a logical server providing services to the multifunction siren device 102 or other clients, such as, but not limited to, the user device 126. The cloud server 128 is hosted and/or delivered via the network 118. In some non-limiting examples, the cloud server 128 is associated with one or more physical servers in one or more data centers. In other examples, the cloud server 128 is associated with a distributed network of servers.

The cloud server 128, in some non-limiting examples, hosts a remote function manager application which generates unique unlock codes used to unlock one or more functions on the multifunction siren device 102. In these examples, a function manager 136 on the multifunction siren device 102 manages locked functions on the multifunction siren device 102. If a user wants to unlock a selected function on the multifunction siren device 102, the user connects the multifunction siren device 102 to the user device 126. The user device sends a request to unlock the selected function to the cloud server 128. In response to the request, the cloud server generates the unlock code 138 and transmits the unlock code to the user device 126. The user device 126 provides the unlock code to the multifunction siren device 102. The multifunction siren device 102 unlocks the selected function, thereby enabling the selected function to operate normally, in response to receiving the unlock code 138. In some examples, the user pays a license fee prior to the cloud server generating and/or sending the unlock code to the user device 126.

The system 100 can optionally include a data storage device 130 for storing data, such as, but not limited to a list of available function(s) 140 for the multifunction siren device 102 and a status 142 of each function. An available function is a function the multifunction siren device 102 is capable of performing an operation/function but cannot operate in the locked state. The status 142 indicates which of the available functions are locked (inoperable) and which of the available functions are unlocked (operable). A locked function can be unlocked by the user via a configurator hosted on the cloud server 128.

The data storage device 130 can include one or more different types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The data storage device 130 in this example is a separate device from the multifunction siren device 102. The data storage device 130 is accessed by the multifunction siren device 102 via the network 118. However, in other examples, the data storage device 130 is included within the multifunction siren device 102.

The memory 112, in some examples, stores one or more computer-executable components. Exemplary components include the function manager 136, that, when executed by the processor 110 of the multifunction siren device 102, store the list of available functions 140 associated with the plurality of functions 104 on the multifunction siren device 102 and/or the data storage device 130. The unlock code 138 is received from the user device 126 communicatively coupled to the multifunction siren device 102. The unlock code 138, in this example, is associated with at least one selected function in the list of available functions that is locked. The selected function can include an amplifier function and/or a siren tone or other lockable function. The function manager changes the lock status of the selected function from the locked state to an unlocked state in response to receiving the unlock code 138.

In some examples, when a function is unlocked, the device remains in the unlocked state until it is manually changed back to the locked state. If the function state is not changed from the unlocked state to the locked state by a user, the function remains permanently operable. In other examples, the function manager 136 returns the lock status of the selected function from the unlocked state back to the locked state at a termination of a predetermined license time-period.

In the example described above in FIG. 1, at least one function is locked at manufacture time. However, the examples are not limited to locking functions at manufacture time. The one or more functions, in other examples, are locked at an initialization time. The initialization time is a time at which the siren device is initialized. The initialization process can occur during manufacture of the siren device (at manufacture time), after manufacture is complete but prior to shipping, during packaging of the siren device for shipping (shipping preparation), or during initial programming of the device or registration of the device.

In other examples, the memory further stores a unique identifier (UID) 124 assigned to the multifunction siren device 102. In some examples, the UID 124 is generated and assigned to the multifunction siren device 102 at the time of manufacture. In other examples, the UID 124 is assigned and stored on the internal memory of the multifunction siren device 102 during a device registration process and/or a device initialization process. The registration process occurs when a user connects the multifunction siren device 102 to a user device to register a newly purchased, leased, or recently received device. The initialization process is a process in which one or more functions on a device are locked or unlocked prior to installation of the multifunction siren device 102 on a vehicle or prior to placing the device into service.

In the example shown in FIG. 1, the multifunction siren device 102 is an electronic siren device the is removably mountable on an emergency vehicle. However, in other examples, the multifunction siren device 102 is mounted on a pole, on a building, on a water tower, or other structure. For example, siren devices may be mounted on the roof or side of a fire station, police station, tornado shelter or other emergency services related building, vehicle, or structure.

Figure 2:
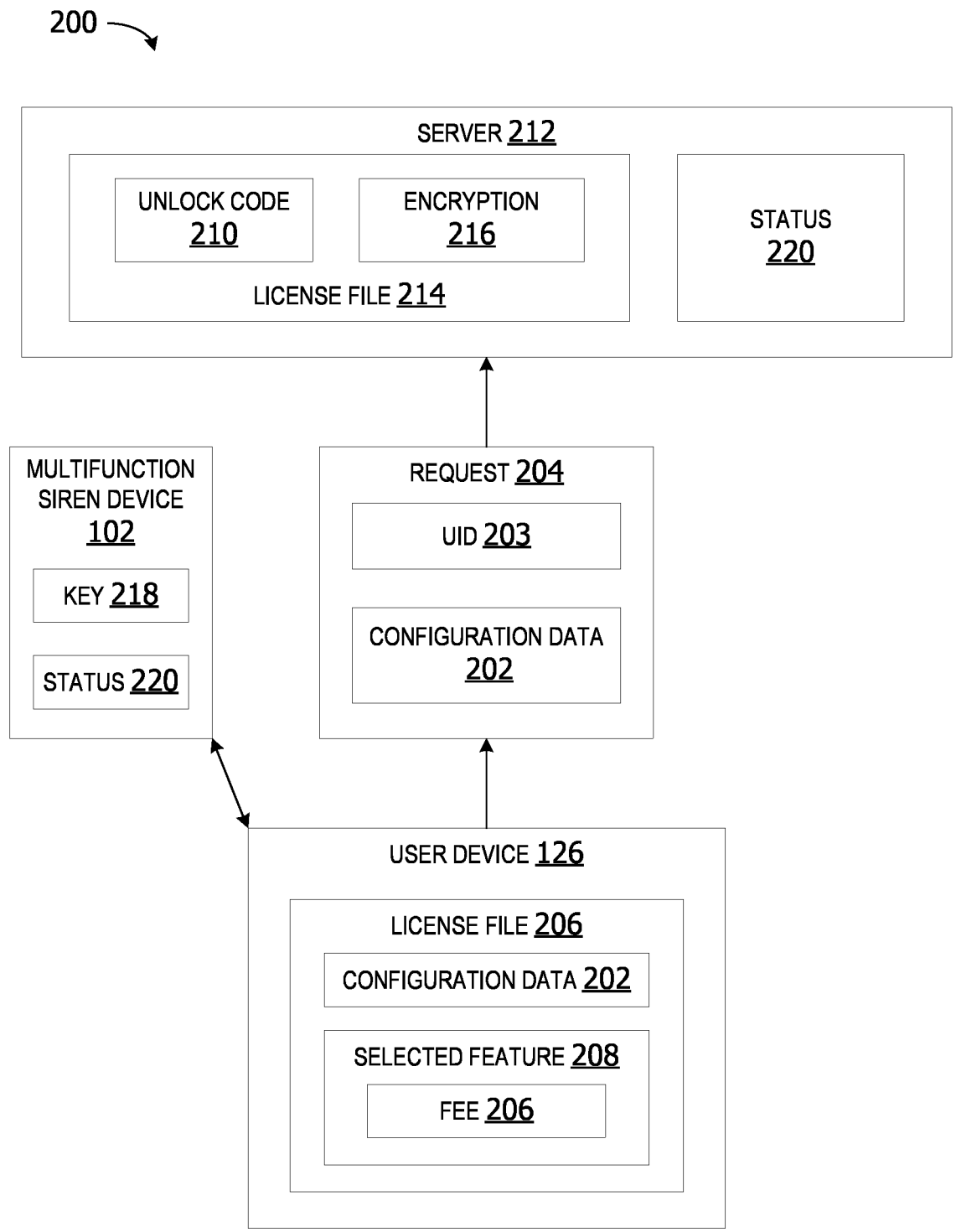
FIG. 2 is an exemplary block diagram illustrating a system for locking functions on a siren device using configuration data.

FIG. 2 is an exemplary block diagram illustrating a system 200 for locking functions on a multifunction siren device 102 using configuration data 202. In some examples, a user device 126 generates a request 204 to unlock one or more functions on the multifunction siren device 102. The configuration data 202 is data describing the one or more locked functions the user is requesting to unlock. In some examples, the configuration data includes an identification of the selected function 208 and an indication (confirmation) whether the user has paid a fee 206 associated with unlocking the selected function 208.

The request 204 is a request for an unlock code 210. In this example, the request includes the configuration data 202 and a UID 203. In response, a server 212 generates a license file 214 including the unlock code 210. The server is a computing device that generates the unlock code 210. In some examples, the server 212 is implemented as a cloud server, such as, but not limited to, the cloud server 128 in FIG. 1.

The license file 214 is optionally encrypted using one or more encryption 216 key(s), such as, but not limited to, a symmetric or asymmetric cryptographic key. In one example, the license file is encrypted using a private cryptographic key and the license file is decrypted by the user device 126 using a corresponding public cryptographic key. In still other examples, the license file is encrypted using a public key and the user device decrypts the file using a corresponding private key, such as, but not limited to, the cryptographic key 218. The cryptographic key 218 is stored on the multifunction siren device 102, in this non-limiting example.

The user device decrypts the license file to obtain the unlock code 210. The unlock code 210 is used to unlock the selected function 208. The status 220 of the selected function is updated on the multifunction siren device 102 and/or on the server 212 to indicate the selected function is unlocked.

Figure 3:
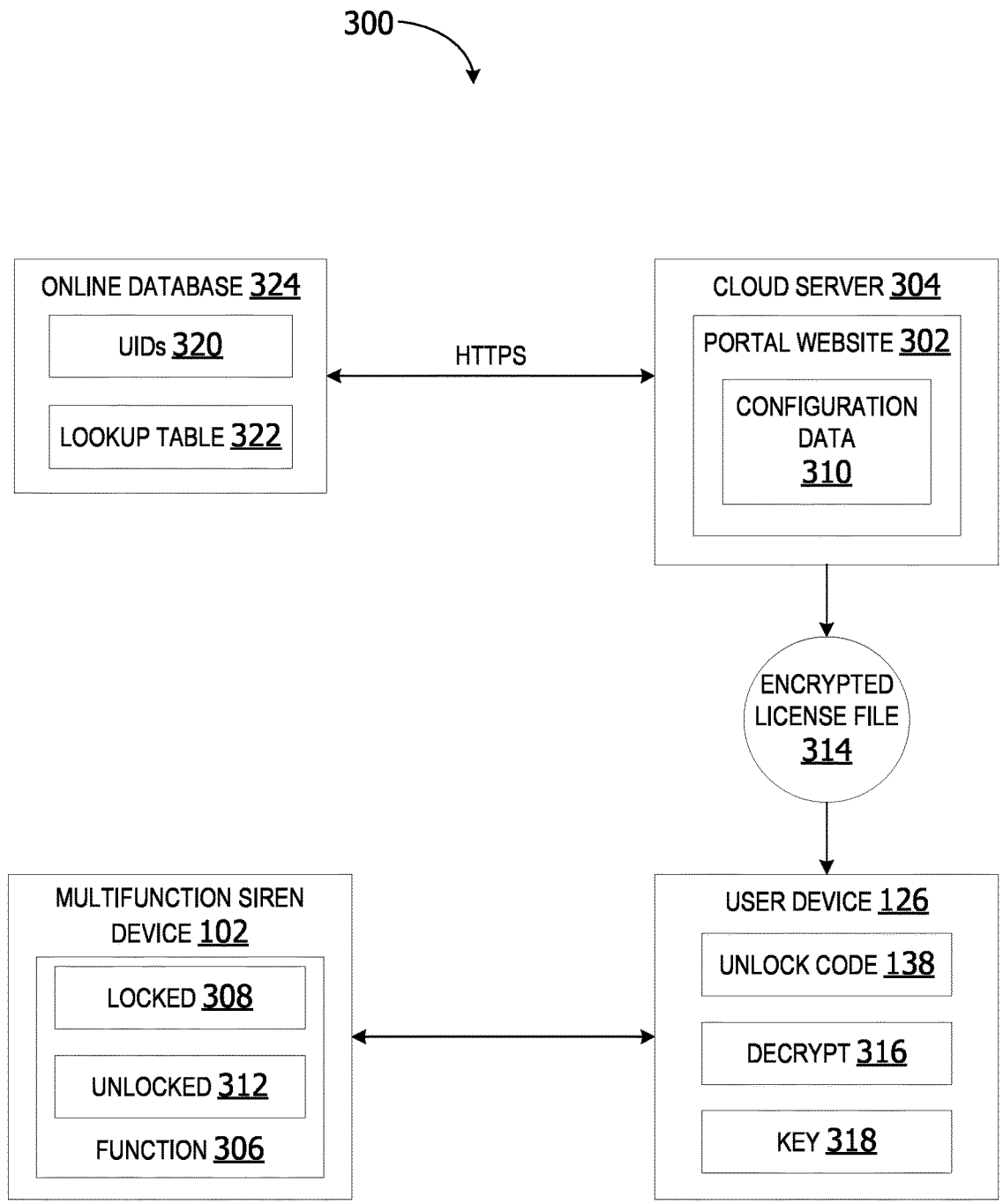
FIG. 3 is an exemplary block diagram illustrating a system for unlocking locked functions on a siren device via a portal website hosted on a cloud server.

Turning now to FIG. 3, an exemplary block diagram illustrating a system 200 for unlocking locked functions on the multifunction siren device 102 via a portal website 302 hosted on a cloud server 304 is depicted. In this non-limiting example, the user device 126 connects to the multifunction siren device 102. The connection may be a wireless or wired connection. The cloud server 304 is a server, such as, but not limited to, the cloud server 128 in FIG. 1.

In this non-limiting example, the multifunction siren device 102 is connected to the user device 126 via a universal serial bus (USB) port on the multifunction siren device 102 and/or the user device 126. At least one function 306 is in a locked 308 state in which the function 306 is disabled. The user utilizes the user device 126 to access the portal website 302, which is presented to the user on a user interface, such as, but not limited to, the user interface 132 in FIG. 1. The portal website sends a portal page to the user device 126. The user interacts with the portal page to generate configuration data 310 specifying one or more functions to be unlocked 312. The configuration data 310 is data describing a set of user preferences/selection with regard to one or more functions on the multifunction siren device to be licensed (unlocked).

In some examples, the cloud server 304 utilizes the configuration data 310 to generate an encrypted license file 314. The license file is encrypted in some examples using cryptographic keys, such as, but not limited to, a public key and private key. For example, the cloud server 304 encrypts the license file using a public key. The user device 126 uses a private cryptographic key 318 corresponding to the public key to decrypt 316 the file to obtain the unlock code. The unlock code is used by the user device 126 to unlock the locked function 306.

In other examples, the configuration data 310 includes a UID 320 assigned to the multifunction siren device 102. In some examples, the UID 320 is assigned and stored on the multifunction siren device at manufacture. In other examples, the UID is assigned and programmed onto the multifunction siren device at device registration time. The device is registered by connecting the multifunction siren device to the user device and logging into the cloud server or other device registration website.

The UID is generated by the remote device manager and assigned to the multifunction siren device. Each multifunction siren device is assigned a different UID. The remote device manager uses the UID to locate function-related data associated with the multifunction siren device 102 in a lookup table 322. In this example, the lookup table is stored in an online database 324, such as, but not limited to, a database on the cloud server or a cloud storage. In other examples, the lookup table 322 is stored on a data storage device accessible by the cloud server 304, such as, but not limited to, the data storage device 130.

In this example, the remote device manager is hosted on the cloud server. In other examples, the remote device manager is hosted on a physical computing device, such as, but not limited to, the server 212 in FIG. 2.

In some examples, a host website generates a license file. The user downloads the license file or generates it on the user computing device. In some examples, the license file is generated via an application which is downloaded from the host website onto the user device.

The user device sends a request, including a UID, such as a serial number, on a hypertext protocol (HTTP) call to a database that stores UID serial numbers for each multifunction siren device. Each product/siren device has a unique serial number (UID). Unique serial numbers are generated at the server. Every product is warranty dated to identify the date of manufacture. The UID is stored in a database and programmed to each multifunction siren device product. The multifunction siren device is shipped to the dealer or customer.

In another example, the portal website generates license files sent to the user devices. The user device sends license information to the portal website. It replies and sends configuration data back to website with the level of unlock.

In other examples, the license file is encrypted by the server and decrypted by the client (user device). The encryption, in one example, is advanced encryption standard (AES) 256 or RSA asymmetric or symmetric encryption using public key and private key encryption. In one example, the private key is known only to the multifunction siren device product and used to decrypt the license file to obtain the unlock code.

In other examples, the multifunction siren device includes a receive device (RX) and a transmit device (TX). The multifunction siren device connection point in another example utilizes RS45 protocols to USB. A network call can be performed wirelessly connects to the user device via Wi-Fi, near field communication (NFC), Bluetooth®, ultra-wide band (UWB), or any other type of wireless communication using transistor-transistor logic (TTL) or secure socket layer (SSL) for encrypted communication.

Figure 4:
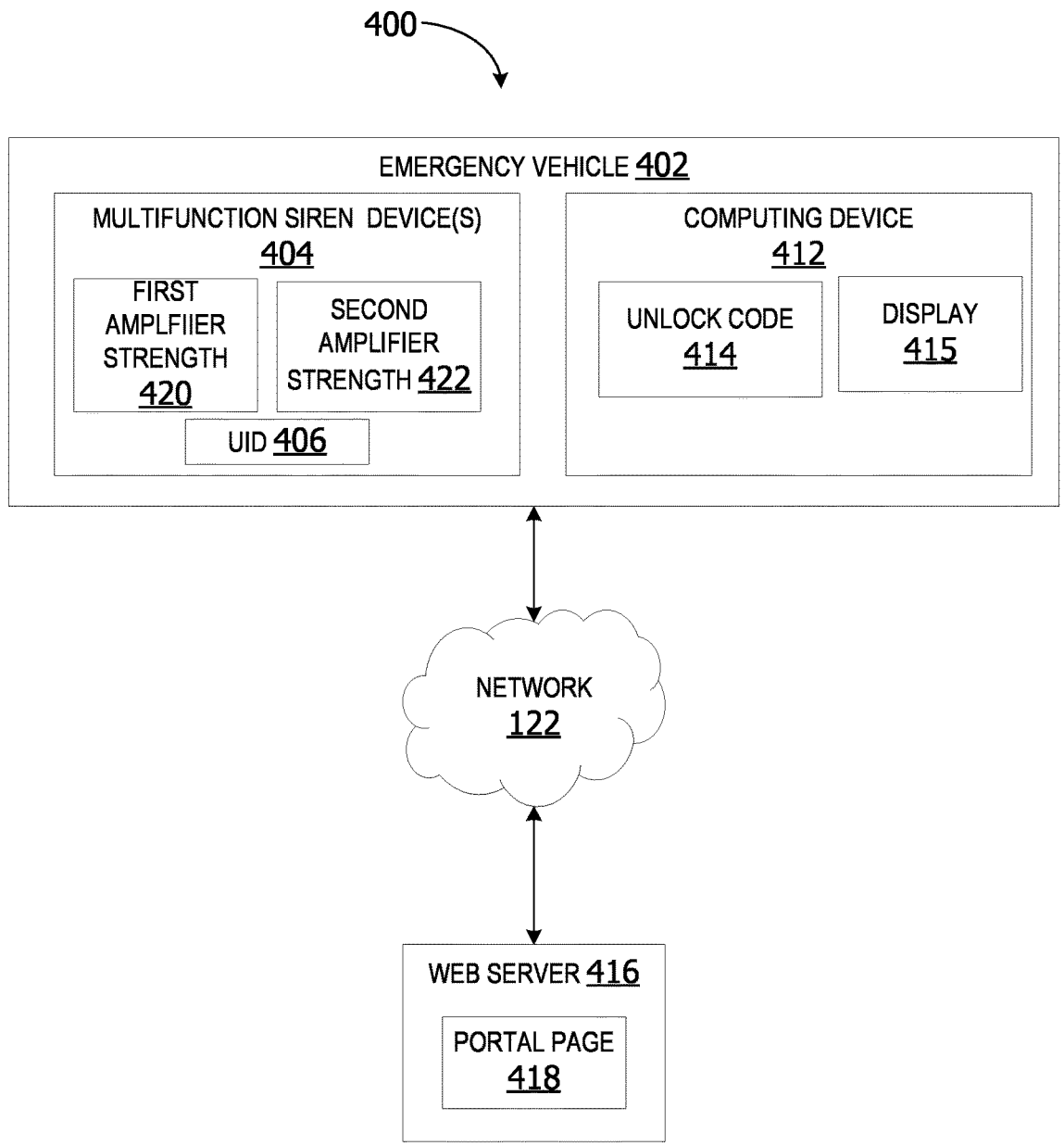
FIG. 4 is an exemplary block diagram illustrating a system for unlocking one or more functions on a siren device installed on an emergency vehicle.

Referring now to FIG. 4, an exemplary block diagram illustrating a system 400 for unlocking one or more functions on a multifunction siren device installed on an emergency vehicle 402 is shown. The emergency vehicle 402 is implemented as any type of emergency vehicle, such as, but not limited to, a police car, police truck, ambulance, tow truck, fire truck, search and rescue vehicle, police motorcycle, etc.

The emergency vehicle 402, in this non-limiting example, includes one or more multifunction siren devices installed on the emergency vehicle 402. The lockable multifunction siren device is assigned a UID 406.

The emergency vehicle 402, in this non-limiting example, includes an onboard computing device 412. The onboard computing device includes a processor and memory The computing device receives an unlock code 414 to unlock one or more functions on the lockable multifunction siren device.

A unique unlock code is required for a first lockable multifunction siren device and a different unlock code is required to unlock function(s) on a second lockable multifunction siren device. In other examples, a different unlock code is required to unlock each different function on the same multifunction siren device. Thus, the unlock code is unique to each device and/or unique to each function on a given device.

In this example, the web server 416 is a computing device or cloud server for hosting a web page or portal page 418, such as, but not limited to, the cloud server 128 in FIG. 1 and/or the server 212 in FIG. 2. In this manner, the user can utilize the computing device connected to the multifunction siren device to unlock one or more functions of the multifunction siren device without detaching the multifunction siren device from the emergency vehicle. However, the examples are not limited to connecting the multifunction siren device(s) to a computing device while installed on an emergency vehicle. In other examples, a multifunction siren device is attached to a user device or other computing device before the multifunction siren device is installed on an emergency vehicle 402 and/or the multifunction siren device is uninstalled from the emergency vehicle when the user wants to unlock additional functions.

In some examples, the computing device includes a display 415 for displaying a list of lockable functions and a lock status of each lockable functions. In this example, the display 415 is implemented via a user interface, such as, but not limited to, the user interface device 116 in FIG. 1. However, in other examples, the display can be implemented as any other type of display or user interface. For example, the display 415 can include a virtual reality (VR), mixed reality (MR) and/or augmented reality (MR) display.

In other examples, the siren device includes a set of lockable functions including a first amplifier function 420 and a second amplifier function 422. The first amplifier function 420 is a lockable function. In this non-limiting example, the first amplifier function 420 is a 100 w amplifier function. However, the examples are not limited to a 100 w amplifier function. The first amplifier function can alternatively be implemented as a 200 w amplifier, a 300 w amplifier or a 400 w amplifier.

The set of lockable functions in this example also includes a second amplifier function that is also a lockable function. In this non-limiting example, the second amplifier function 422 is a 200 w amplifier function. The second amplifier function 422 is a greater wattage than the first amplifier function. However, the examples are not limited to a 200 w amplifier. In other examples, the second amplifier function is a 300 w amplifier, a 400 w amplifier or any other amplifier wattage that is known or available. The user can unlock the first amplifier function using a first unlock code. The user can unlock the second amplifier function using a different, second unlock code. In other words, each lockable function has a unique unlock code.

The examples are not limited to function-specific unlock codes. In other examples, the unlock codes are configurable such that a single unlock code can be configured to unlock two or more different functions on a single siren device. In these examples, the unlock code is device-specific such that each siren device utilizes a different, unique unlock code to unlock one or more locked functions on the siren device.

Figure 5:
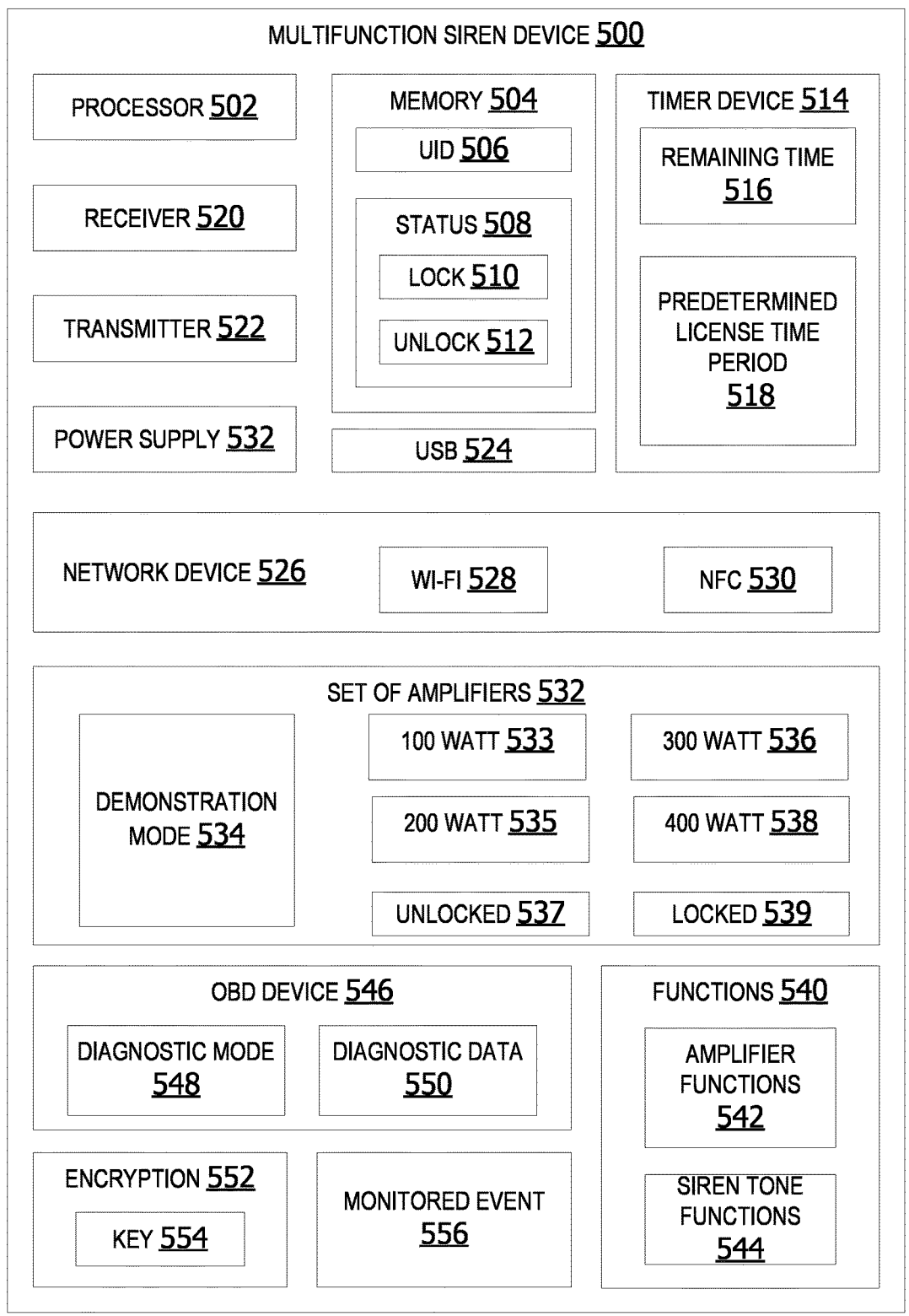
FIG. 5 is an exemplary block diagram illustrating a siren device.

FIG. 5 is an exemplary block diagram illustrating a multifunction siren device 102. The multifunction siren device 102 includes at least one processor 502 communicatively coupled to a memory 504. The memory 504, in this example, stores a UID 506 assigned to the multifunction siren device 102 and/or a status 508 of one or more functions on the multifunction siren device 102. The status 508 is a lock 510 or an unlock 512 status.

In this example, a timer device 514 monitors remaining time 516 associated with a monitored event 556, such as, but not limited to, an expiration or renewal date associated with a predetermined license time-period 518 for a licensed function. In some examples, the timer device monitors events, such as, but not limited to, an expiration of the license time-period, expiration of a warranty, a maintenance due date, a license renewal reminder date, a warranty renewal reminder date and/or any other user-defined event. A renewal reminder and/or an expiration notification is sent to the user device upon occurrence of the monitored event.

In some examples, the timer device 514 is a clock or other device for measuring a passage of time. In still other examples, the timer device 514 is a global positioning system (GPS) based device which calculates a duration of time based on GPS data.

The multifunction siren device 102 communicates with a user device via a communications device, such as, but not limited to, the communications interface device 120 in FIG. 1. In some examples, the multifunction siren device 102 includes a receiver (Rx) for receiving data and/or a transmitter (Tx) for transmitting data to one or more other devices. In still other examples, the multifunction siren device 102 connects with the user device via a wired connection to a USB 524 port. In still other examples, a network device 526 enables the multifunction siren device 102 to exchange data with the user device via Wi-Fi 528 and/or a near field communication (NFC).

In some examples, the multifunction siren device 102 performs network calls using Wi-Fi 528, NFC, Bluetooth®, transistor-to-transistor logic (TTL) communications and/or secure socket layer (SSL). However, the system is not limited to wireless communications. As discussed above, the multifunction siren device can also communicate with the user device via a wired communication, such as, but not limited to, USB, ethernet, or other wired communications.

The multifunction siren device 102 includes a set of amplifiers 532 having one or more amplifier devices. In this example, the set of amplifiers 532 includes a 100 w amplifier 533, a 200 w amplifier 535, a 300 w amplifier 536 and a 400 w amplifier 538. However, the examples are not limited to a siren device capable of all four of these amplifier functions. In other examples, the siren device is only capable of 100 w amplifier function and a 200 w amplifier function. In still other examples, the siren device is capable of a 100 w amplifier function, a 200 w amplifier function and a 300 w amplifier function. In yet other examples, the siren device is capable of any other known siren amplifier wattages not specified herein.

The 100 w amplifier 533, in this non-limiting example, is in an unlocked 537 state in which the 100 w amplifier is able to operate normally. The 200 w amplifier 535, the 300 w amplifier and the 400 w amplifier, in this example, is in a locked 539 state, in which the siren device is unable to operate normally at amplifier function wattages greater than 100 w. The 200 w amplifier 535 in the locked state can operate in a demonstration mode 534 while the multifunction siren device 102 is connected to the user device. Otherwise, the 200 w amplifier 535, in this example, remains inoperable until the state is updated from the locked to the unlocked state.

The multifunction siren device 500 has a plurality of available functions 540. The functions 540 include one or more amplifier functions (100 w, 200 w, 300 w and/or 400 w) and/or one or more siren tone functions 544. The siren tone functions 544, in some non-limiting examples, include wail, air horn, yelp, PA, noise cancellation, radio rebroadcast, and/or dual tone sounds. However, the examples are not limited to these siren tones. In other examples, the siren tones can include siren sounds not listed herein. Each function can be locked or unlocked.

An on-board diagnostic (OBD) 546 enables the multifunction siren device 102 to initiate a diagnostic mode 548 to test one or more functions of the multifunction siren device 102. In the diagnostic mode, the test(s) are performed to generate diagnostic data indicating a functional state of one or more amplifiers and/or siren sounds in the plurality of functions on the multifunction siren device 102.

The multifunction siren device 102 optionally also includes an encryption 552 key 554 for encrypting or decrypting data. In this example, the key 554 is a key for decrypting an unlock code received from the cloud server 128 in FIG. 1 and/or the server 212 in FIG. 2.

Figure 6:
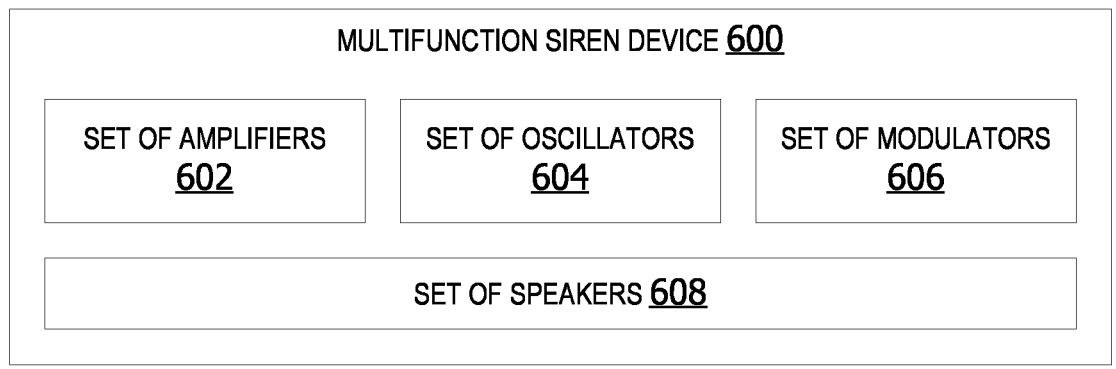
FIG. 6 is an exemplary block diagram illustrating siren device features.

Turning now to FIG. 6, an exemplary block diagram illustrating a multifunction siren device 600 is shown. The siren device 600, in this non-limiting example, is an electronic siren device that includes a set of one or more amplifiers 602, a set of one or more oscillators 604, a set of one or more modulators 606 that synthesize one or more siren tones. However, the multifunction siren device is not limited to these components. In other examples, the multifunction siren device can include a processor, a memory and/or other circuitry for generating one or more siren tones.

The siren device optionally also includes a set of one or more speakers 608. The speaker(s) in this example are incorporated within the siren device housing. However, in other examples, the speakers can be implemented as one or more external speakers removably coupled to the siren device 600.

Figure 7:
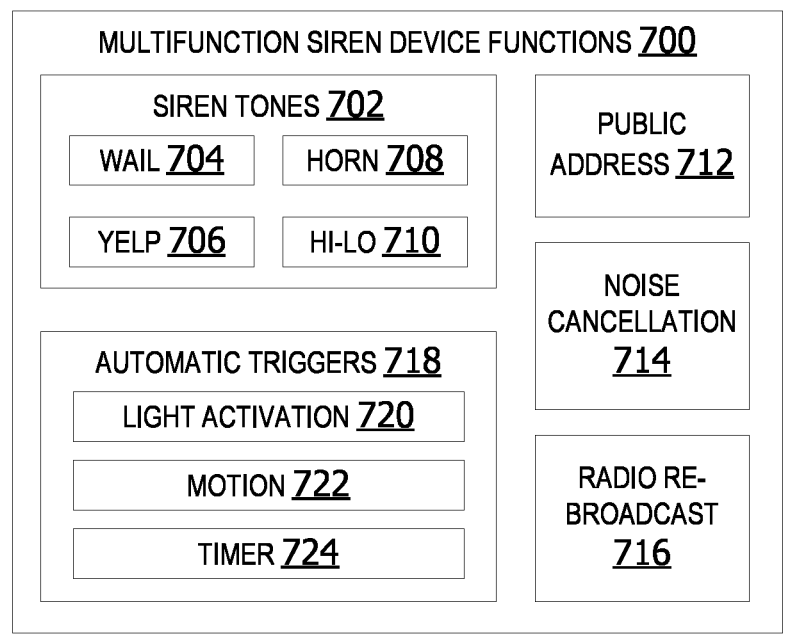
FIG. 7 is an exemplary block diagram illustrating siren device functions.

FIG. 7 is an exemplary block diagram illustrating multifunction siren device functions 700. The multifunction siren device 700 is a device having two or more function modes, such as, but not limited to, a 100 w amplifier and a 200 w amplifier, as shown in FIG. 5 above. In this example, the multifunction siren device also includes a plurality of additional lockable functions, such as, but not limited to, a set of siren tones 702. The set of siren tones 702, in this non-limiting example, includes wail 704, yelp 706, air horn 708 and hi-lo 710 signal. The examples are not limited to this set of siren tones. In other examples, the set of siren tones 702 optionally also include siren tones, such as, but not limited to, phaser, pierce, priority, scan, manual, whistle, or any other available type of siren tone. Other lockable functions which are optionally provided on the siren device include, without limitation, PA 712, noise cancellation 714 and/or radio re-broadcast 716.

The siren device is turned on or off manually in some examples. In these examples, the siren device can be programmed to automatically turn on and off based on light activation 720 of one or more emergency lightbars or other surface mount emergency light devices on an emergency vehicle. For example, if a user activates a fire truck emergency light bar, the siren device can be programmed to also automatically activate and remain activated as long as the emergency vehicle lights are also turned on. The siren can likewise be programmed to automatically turn off when one or more emergency lights on a vehicle are turned off.

In other examples, the siren device is automatically triggered to turn on or turn off. An automatic trigger to activate a siren tone or other siren function can include, for example, but without limitation, a motion sensor detecting motion 722, such as an emergency vehicle in motion, to trigger automatic activation or de-activation of one or more siren tones. For example, a siren can be programmed to turn on if movement is detected near a vehicle, if a user comes into contact with the vehicle or if the vehicle is in motion (being driven at high speed).

A timer 724 function can enable programming a siren to activate (turn on) or de-activate (turn off) at a given time or after passage of a given times. For example, a siren can be programmed to automatically turn off after a pre-determined period of time or automatically turn on at a given time.

Figure 8:
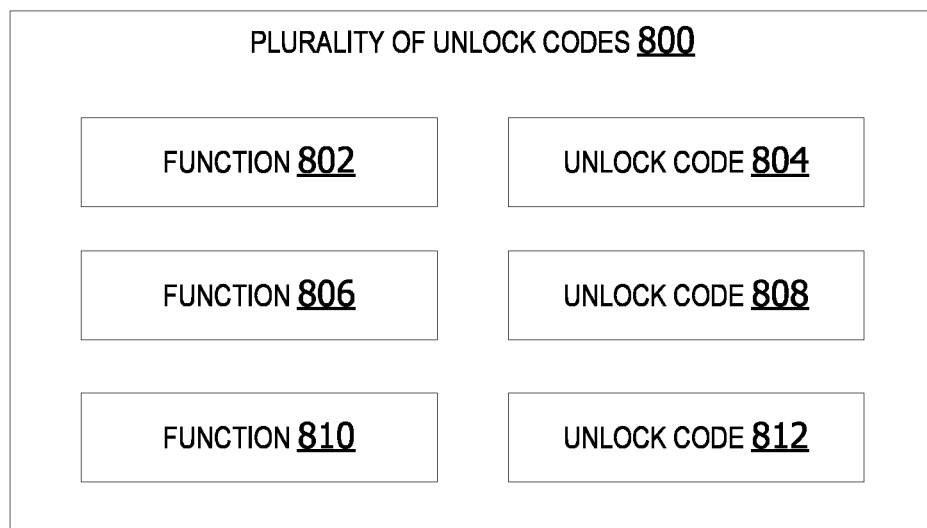
FIG. 8 is an exemplary block diagram illustrating a plurality of unlock codes associated with a plurality of functions on a siren device.

Referring to FIG. 8, an exemplary block diagram illustrating a plurality of unlock codes 800 associated with a plurality of functions on a multifunction siren device is depicted. In this example, each function has a unique unlock code. In this non-limiting example, a first function 802 of a multifunction siren device is unlocked using a first unlock code 804. A second function 806 of the same multifunction siren device is unlocked using a different, second unlock code 808. A third function 810 associated with the multifunction siren device is unlocked using a third unlock code 812. The third unlock code is different than the first unlock code 804 and the second unlock code 808.

Figure 9:
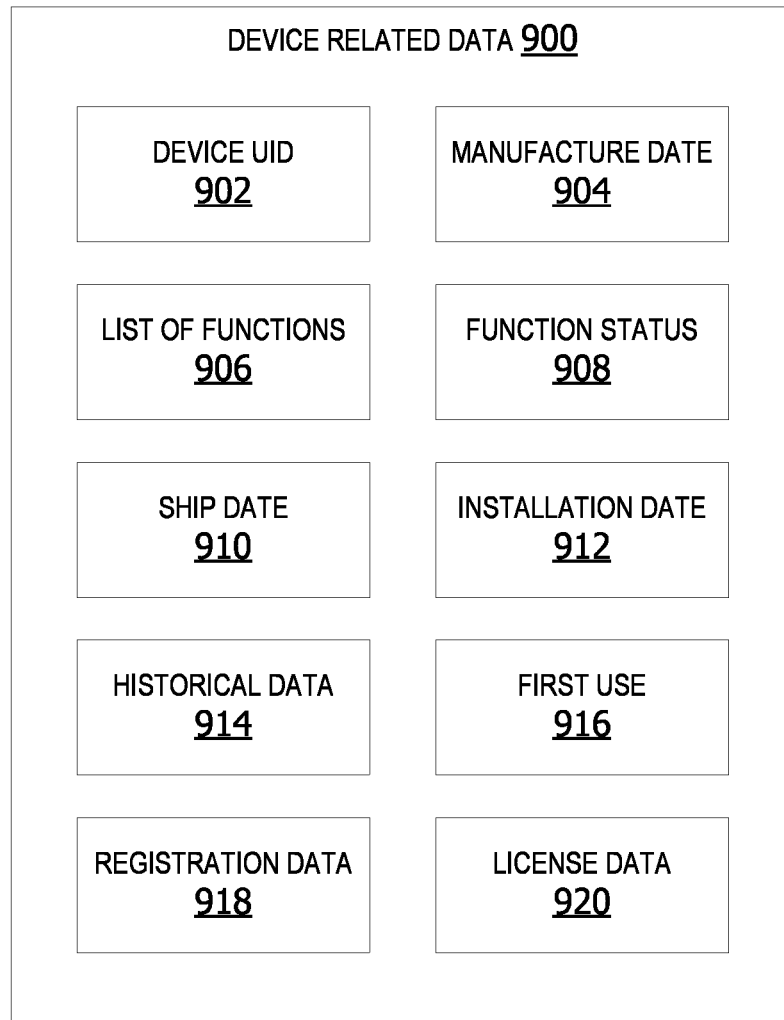
FIG. 9 is an exemplary block diagram illustrating device-related data associated with a siren device.

FIG. 9 is an exemplary block diagram illustrating device-related data 900 associated with a multifunction siren device. The device related data 900 is data associated with a multifunction siren device. The device related data 900 can include device UID 902 assigned to the device. The manufacture date 904 is a date on which the device was produced or manufactured.

The aggregated data can also include a list of available functions 906 for each registered device, both locked functions as well as unlocked functions. The list of functions 906 can include a function status 908 for each function. The function status indicates whether a given function is locked or unlocked. A registered device is a multifunction siren device which has been registered by a user and/or a device on which at least one function has been unlocked. An unregistered multifunction siren device is a device in manufacturer inventory or dealer inventory which has not yet been installed on a vehicle, registered by an end-user and/or licensed additional functions beyond basic functions which are unlocked at manufacture time.

The device related data can further include a ship date 910 on which the device was shipped to a dealer or other purchaser, installation date 912 on which the device was installed on a vehicle, first use 916 indicating the date on which the device was first activated or put into service, as well as other historical data 914.

The registration data 918 and/or license data 920 is optionally also included in the device related data 900. The device related data is stored with aggregated function-related data in the aggregated data store.

Figure 10:
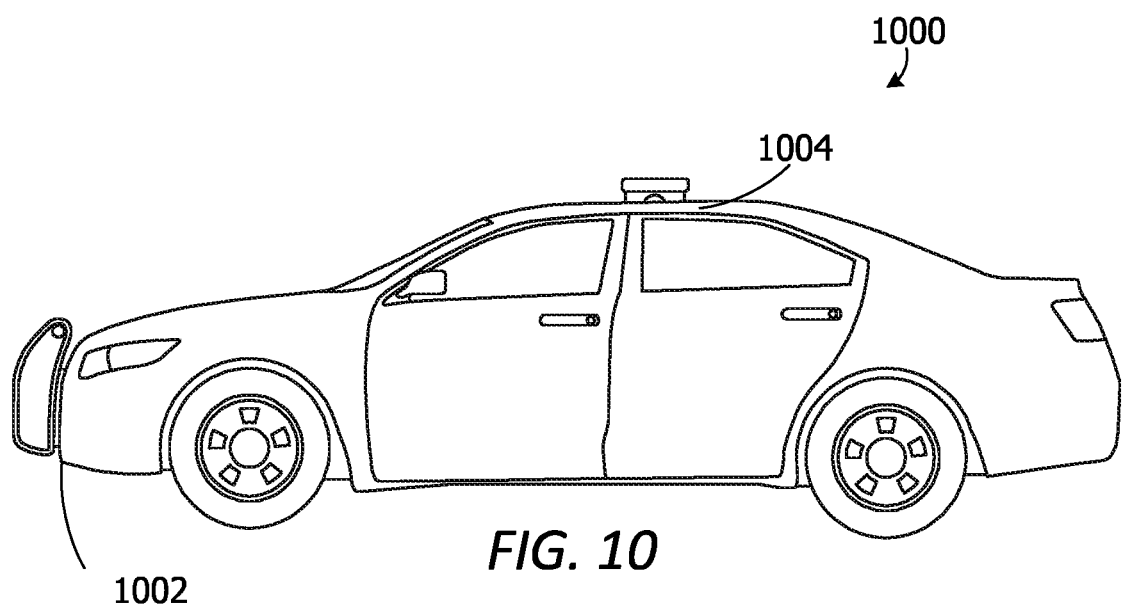
FIG. 10 is an exemplary block diagram illustrating an emergency vehicle sedan including at least one siren device.

Referring now to FIG. 10, an exemplary block diagram illustrating an emergency vehicle sedan 1000 including a multifunction siren device 1002 is shown. In this example, the multifunction siren device 1002 is installed on an exterior surface of the vehicle. The siren is typically located either in the grill or underneath the vehicle.

Figure 11:
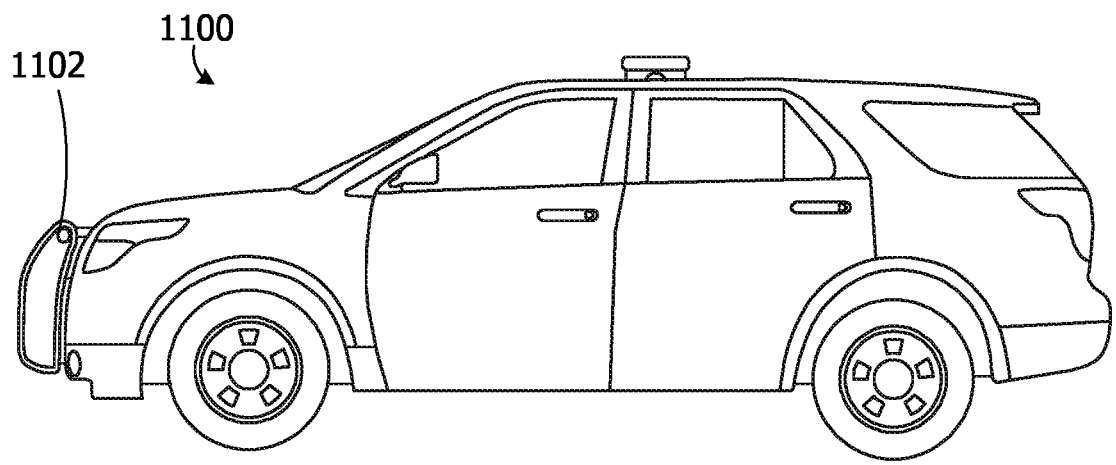
FIG. 11 is an exemplary block diagram illustrating an emergency vehicle sport utility vehicle (SUV) including at least one siren device.

FIG. 11 is an exemplary block diagram illustrating an emergency vehicle sport utility vehicle (SUV) 1100 including a multifunction siren device 1102. In this example, the multifunction siren device 1102 is mounted to the grill or underside of the vehicle 1100.

Figure 12:
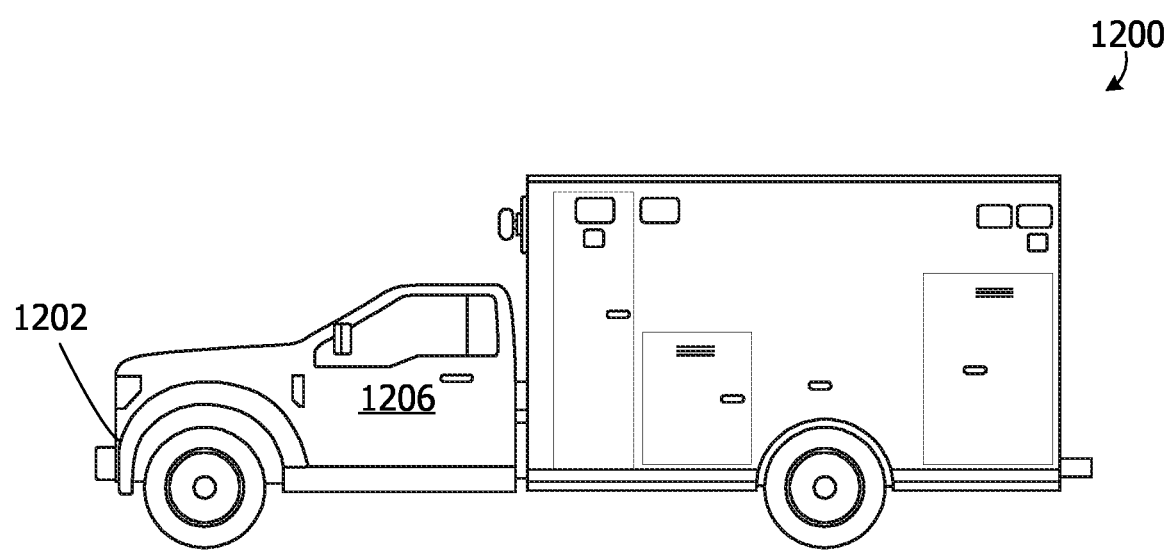
FIG. 12 is an exemplary block diagram illustrating an emergency vehicle pickup truck including at least one siren device.

FIG. 12 is an exemplary block diagram illustrating an emergency vehicle truck 1200 including a multifunction siren device 1202. In this example, the multifunction siren device 1202 includes one or more functions which can be locked at manufacture or prior to installation on the vehicle. The siren device 1202 is unlocked by a user. The user unlocks one or more functions by obtaining an unlock code. In this example, the emergency vehicle truck is a box truck. In other examples, the emergency vehicle truck can include a pickup truck.

Figure 13:
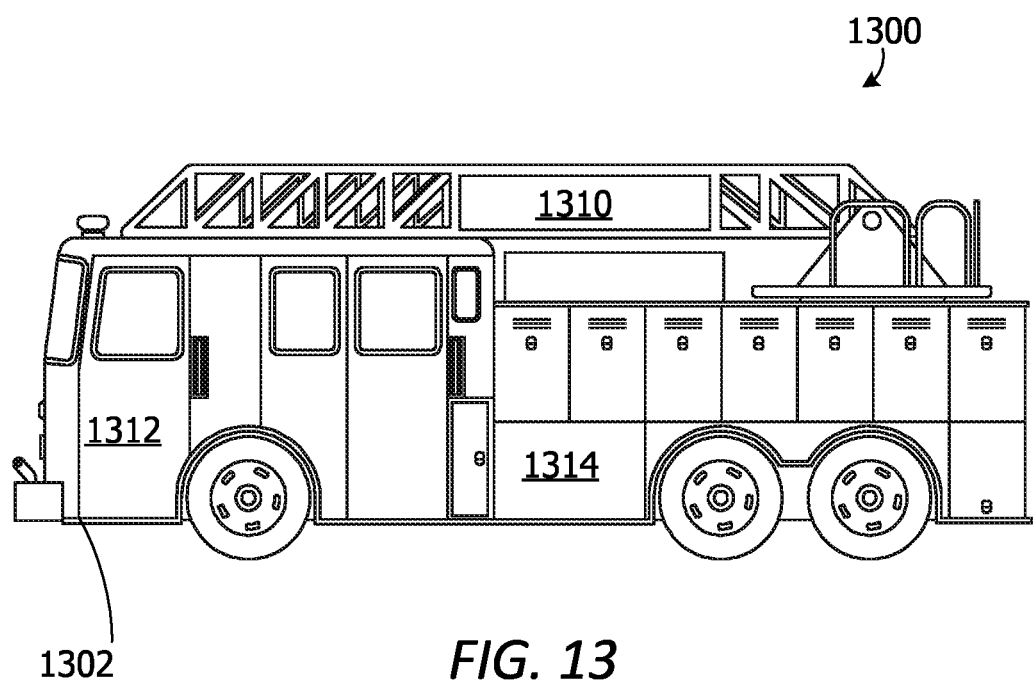
FIG. 13 is an exemplary block diagram illustrating an emergency vehicle firetruck including at least one siren device.

Turning to FIG. 13, an exemplary block diagram illustrating an emergency vehicle firetruck 1300 including a multifunction siren device 1302 is shown. In this example, the siren device 1302 is mounted to an underside of the vehicle. The siren device can also be mounted to a portion of the grill or bumper of the firetruck 1300. The examples are not limited to mounting the siren on the grill or underside of the vehicle. In other examples, the siren device can be mounted on the roof, the hood or on any other portion of the exterior of the fire truck.

Figure 14:
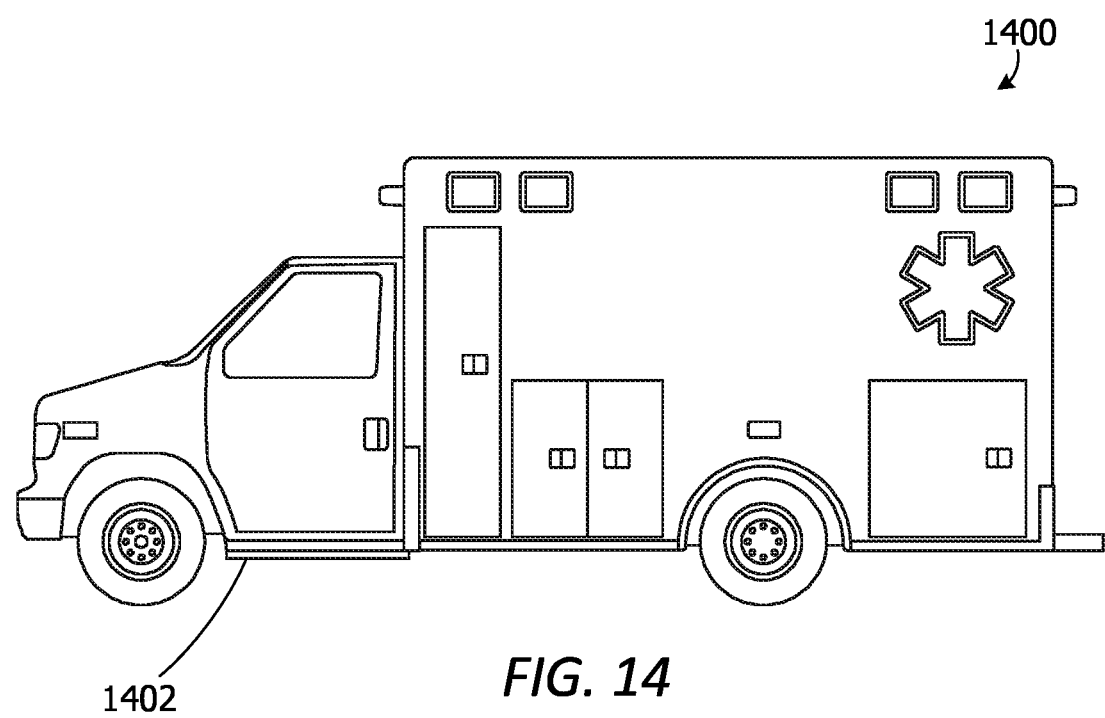
FIG. 14 is an exemplary block diagram illustrating an emergency vehicle ambulance including at least one siren device.

FIG. 14 is an exemplary block diagram illustrating an emergency vehicle ambulance 1400 including a multifunction siren device 1402. In this example, the siren device 1402 is mounted to an underside of the ambulance.

Figure 15:
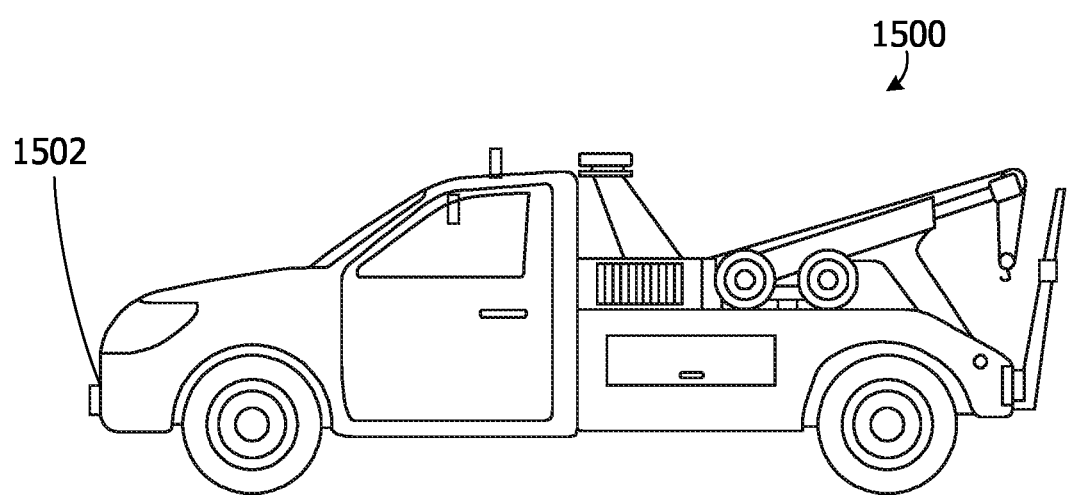
FIG. 15 is an exemplary block diagram illustrating an emergency vehicle tow truck including at least one siren device.

FIG. 15 is an exemplary block diagram illustrating an emergency vehicle tow truck 1500 including a siren device 1502 mounted to an exterior surface of the tow truck 1500. In this example, the siren device is removably mounted to the front grill of the vehicle. In other examples, the tow truck can include one or more other multifunction siren devices mounted to one or more other locations on the exterior of the tow truck 1500.

Figure 16:
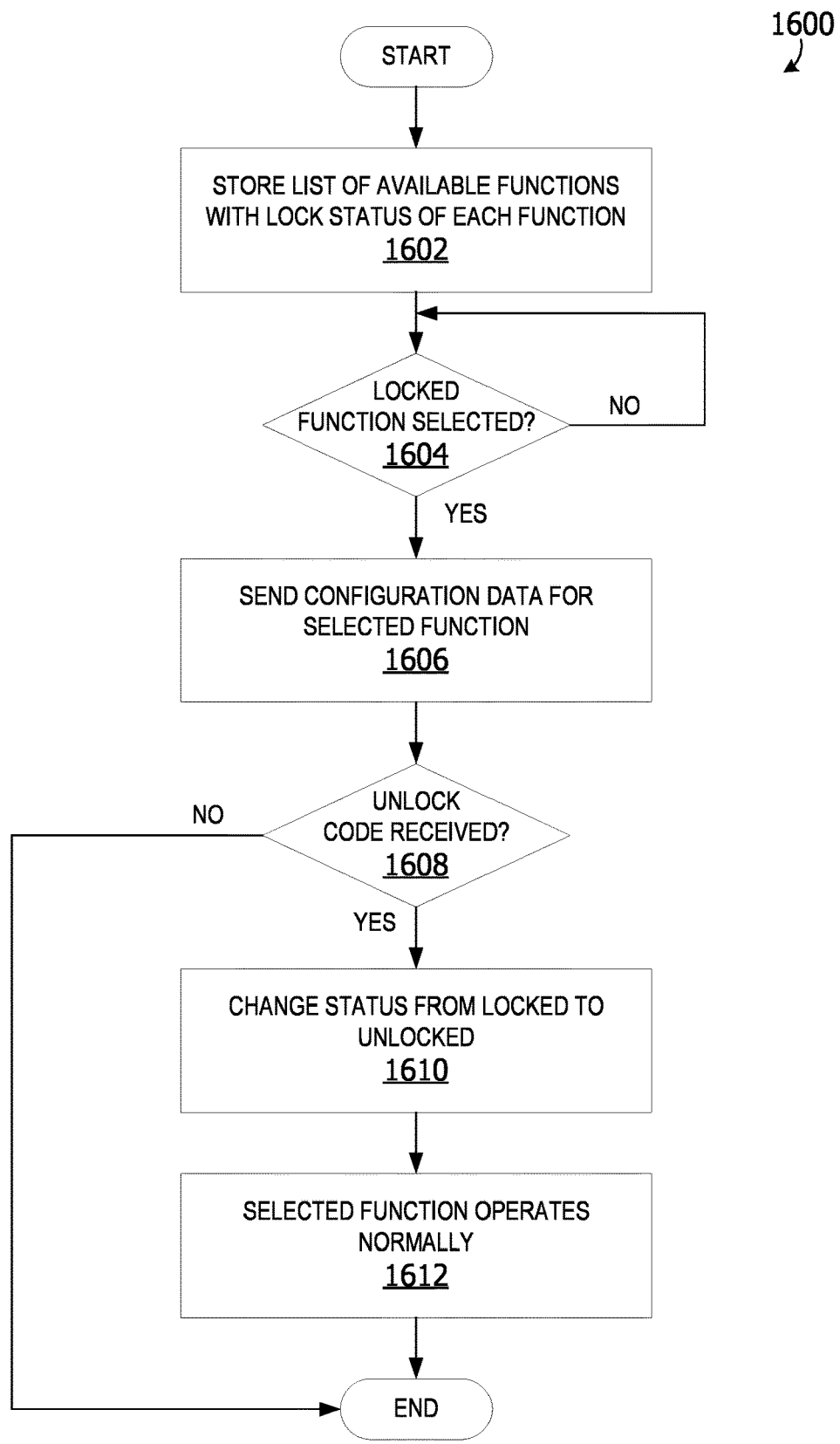
FIG. 16 is an exemplary flow chart illustrating operation of the computing device to unlock functions on a lockable siren device.

Referring to FIG. 16, an exemplary flow chart 1600 illustrating operation of the computing device to unlock functions on a lockable multifunction siren device is depicted. The process shown in FIG. 16 is performed by a function manager executing on a computing device, such as, but not limited to, the multifunction siren device 102 in FIG. 1 and/or the user device 126 in FIG. 1.

The process begins by storing a list of available functions with a lock status of each function at 1602. The list of available functions is displayed on a user interface, such as, but not limited to, the user interface 132 on the user device 126 in FIG. 1. The function manager on the multifunction siren device determines if a locked function is selected at 1604. If a locked function is selected at 1604, configuration data for the selected function is sent to a remote computing device at 1606. The remote computing device generates an unlock code which is capable of unlocking each of the selected locked functions. A determination is made whether the function manager on the multifunction siren device received the unlock code at 1608. If yes, the function manager updates the lock status of the selected function from the lock state the unlocked state at 1610. The selected function operates normally after being unlocked at 1612. The process terminates thereafter.

Figure 17:
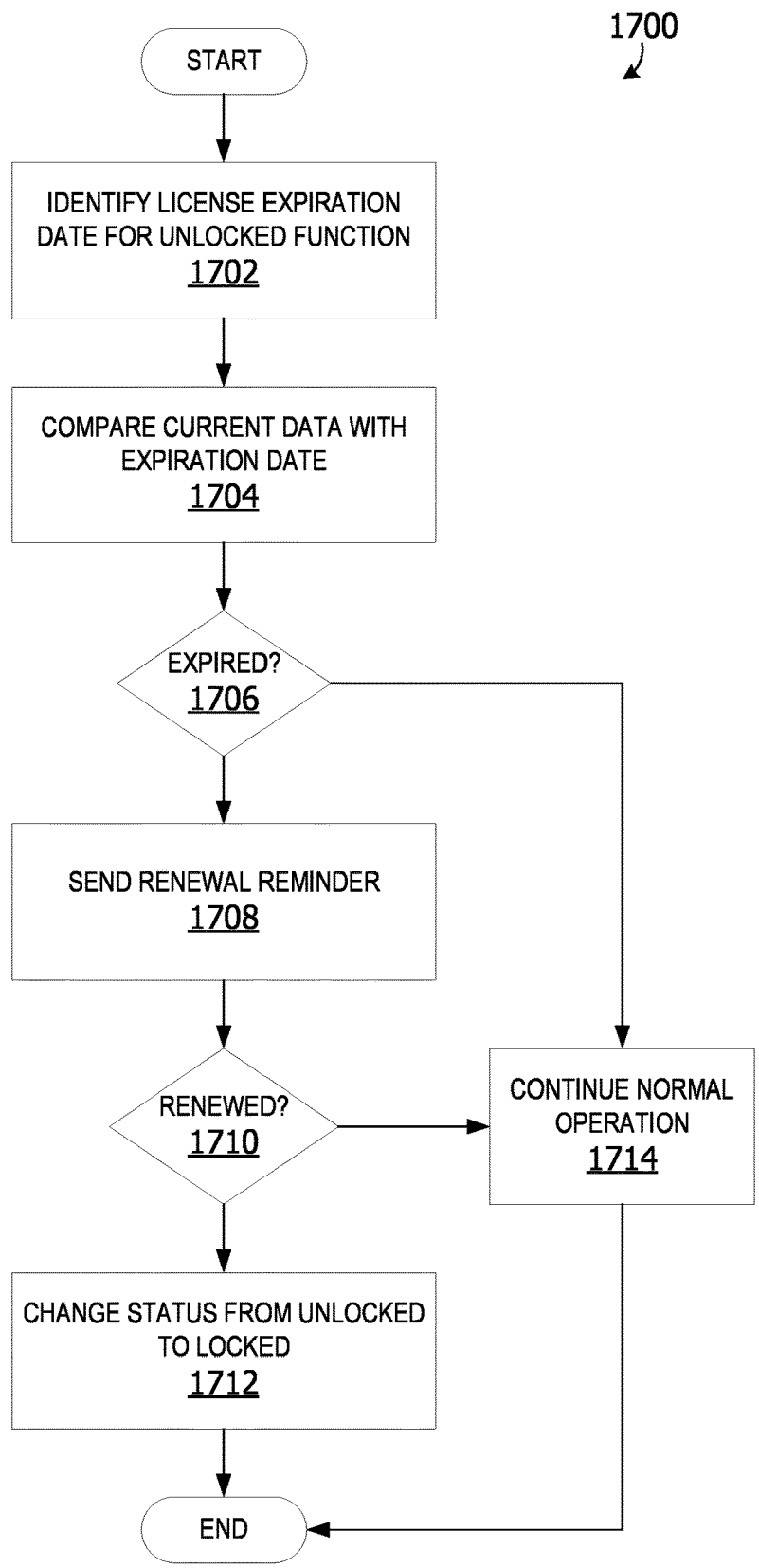
FIG. 17 is an exemplary flow chart illustrating operation of the computing device to generate renewal reminders associated with license expirations.

FIG. 17 is an exemplary flow chart 1700 illustrating operation of the computing device to generate renewal reminders associated with license expirations. The process shown in FIG. 17 is performed by a function manager executing on a computing device, such as, but not limited to, the multifunction siren device 102 in FIG. 1 and/or the user device 126 in FIG. 1.

The process begins by identifying a license expiration date for an unlocked function at 1702. The current date is compared with a first expiration date at 1704. A determination is made whether the license is expired or about to expire at 1706. A license is about to expire if the current date is within a user-configured time period from the expiration date. If yes, the function manager sends a renewal reminder at 1708. The renewal reminder is sent to the user device associated with the user. The function manager determines if the license is renewed at 1710. If no, the function manager changes the status of the function from unlocked to locked when the first expiration date is reached at 1712. If the license is renewed, the first expiration date is updated to a second expiration date consistent with the renewed license. The unlocked function continues normal operation as an unlocked function until the renewed second license expiration date at 1714. The process terminates thereafter.

Figure 18:
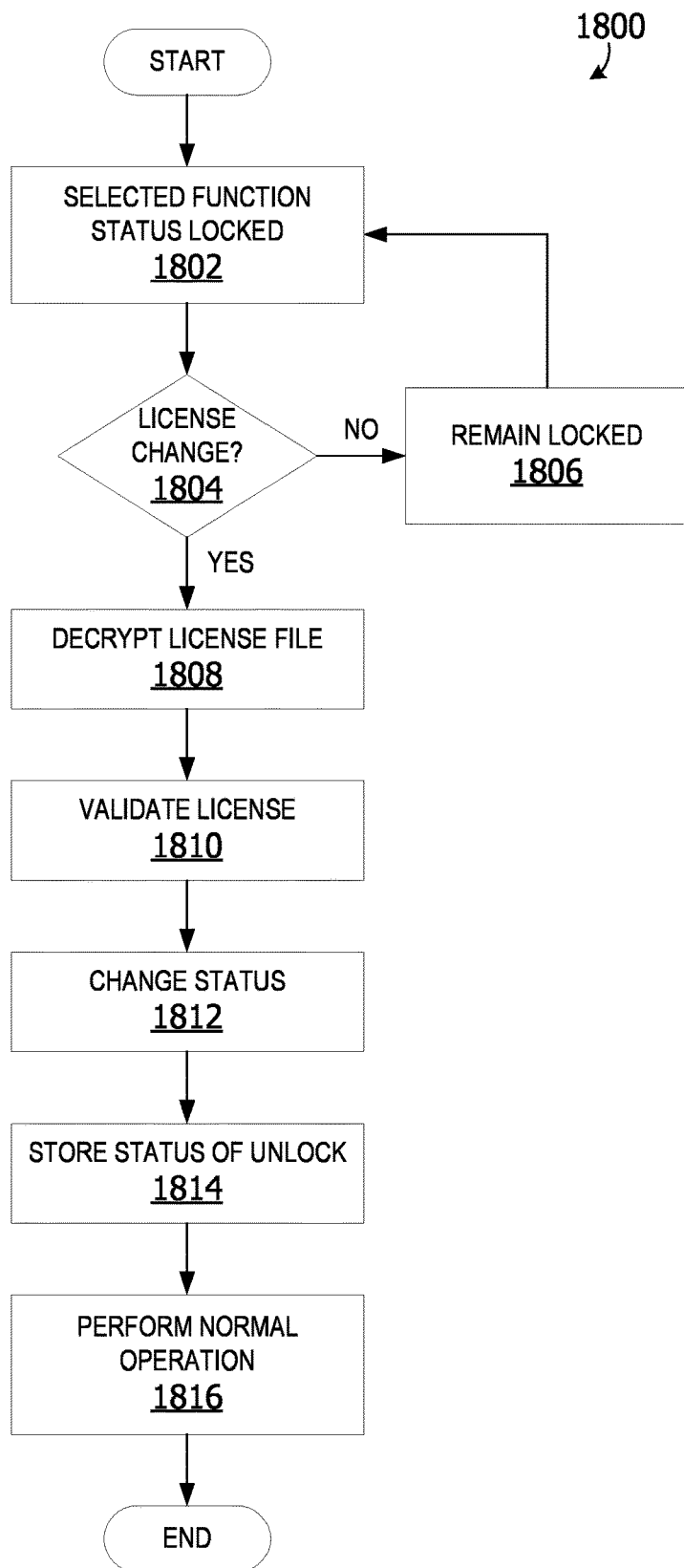
FIG. 18 is an exemplary flow chart illustrating operation of the computing device to validate license files for unlocking functions on a siren device.

FIG. 18 is an exemplary flow chart 1800 illustrating operation of the computing device to validate license files for unlocking functions on a multifunction siren device. The process in FIG. 18 is performed by a function manager executing on a computing device, such as, but not limited to, the multifunction siren device 102 in FIG. 1 and/or the user device 126 in FIG. 1.

The process begins when a selected function status is locked at 1802. The function manager determines if a license is changed at 1804. If no, the status of the function remains locked at 1806. If the license is changed at 1804, the function manager decrypts the license file at 1808. In some examples, the encrypted license file is received from a remote server. The license is validated at 1810. The function manager changes the lock status from locked to unlocked at 1814 if the license is validated. The status of unlock is stored on the multifunction siren device at 1814. In some examples, the lock status is stored on a memory or data storage device on the multifunction siren device. The multifunction siren device is able to perform normal operation of the unlocked function at 1816. The process terminates thereafter.

Figure 19:
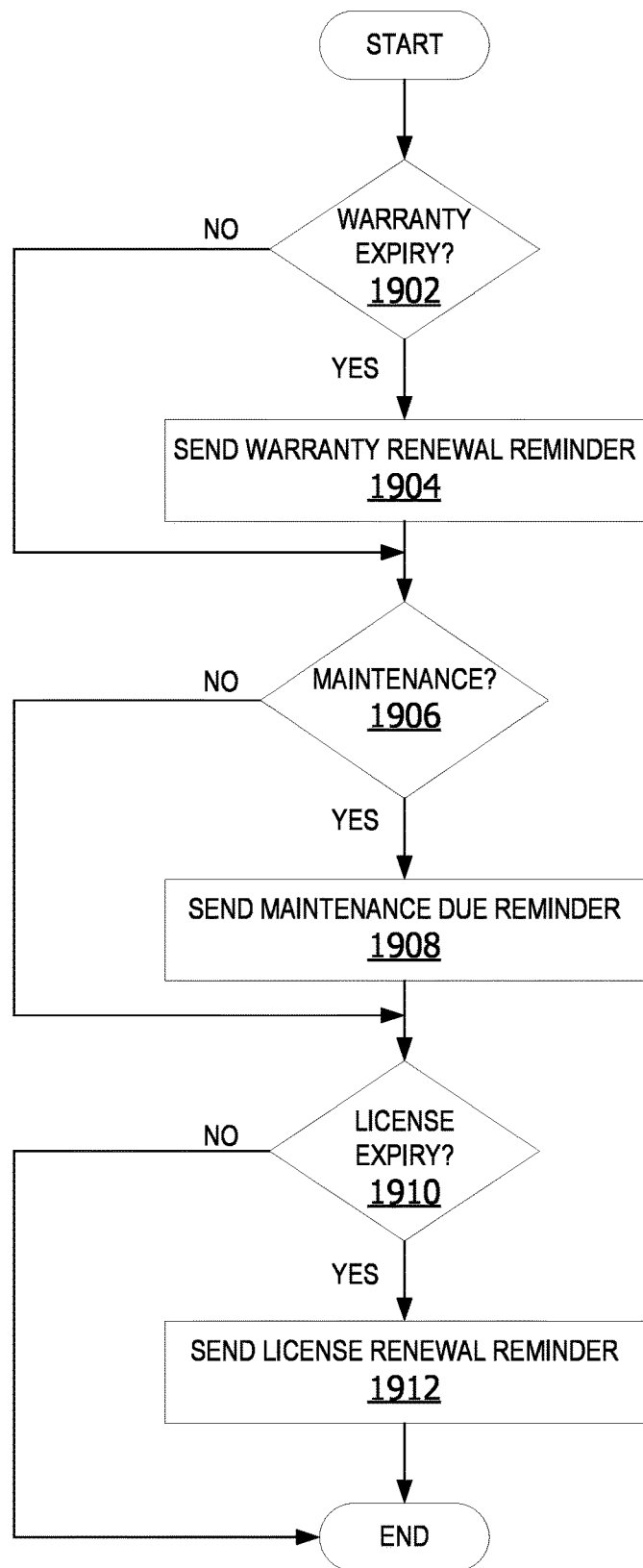
FIG. 19 is an exemplary flow chart illustrating operation of the computing device to generate reminders for users.

FIG. 19 is an exemplary flow chart 1900 illustrating operation of the computing device to generate reminders for users. The process shown in FIG. 19 is performed by a function manager executing on a computing device, such as, but not limited to, the multifunction siren device 102 in FIG. 1 and/or the user device 126 in FIG. 1.

The process begins by determining is a warranty is expired at 1902. If yes, a warranty renewal reminder is sent to the user device at 1904. A determination is made whether maintenance is due on the multifunction siren device at 1906. If yes, the remote device manager sends a maintenance due reminder to the user device at 1908. The remote device manager determines if a license expiry date is approaching at 1910. In some examples, the expiration date is approaching if the expiration date is within a predetermined time-period from the current date. If yes, the remote device manager sends a license renewal reminder at 1912. The process terminates thereafter.

While the operations illustrated in FIG. 19 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 19.

Figure 20:
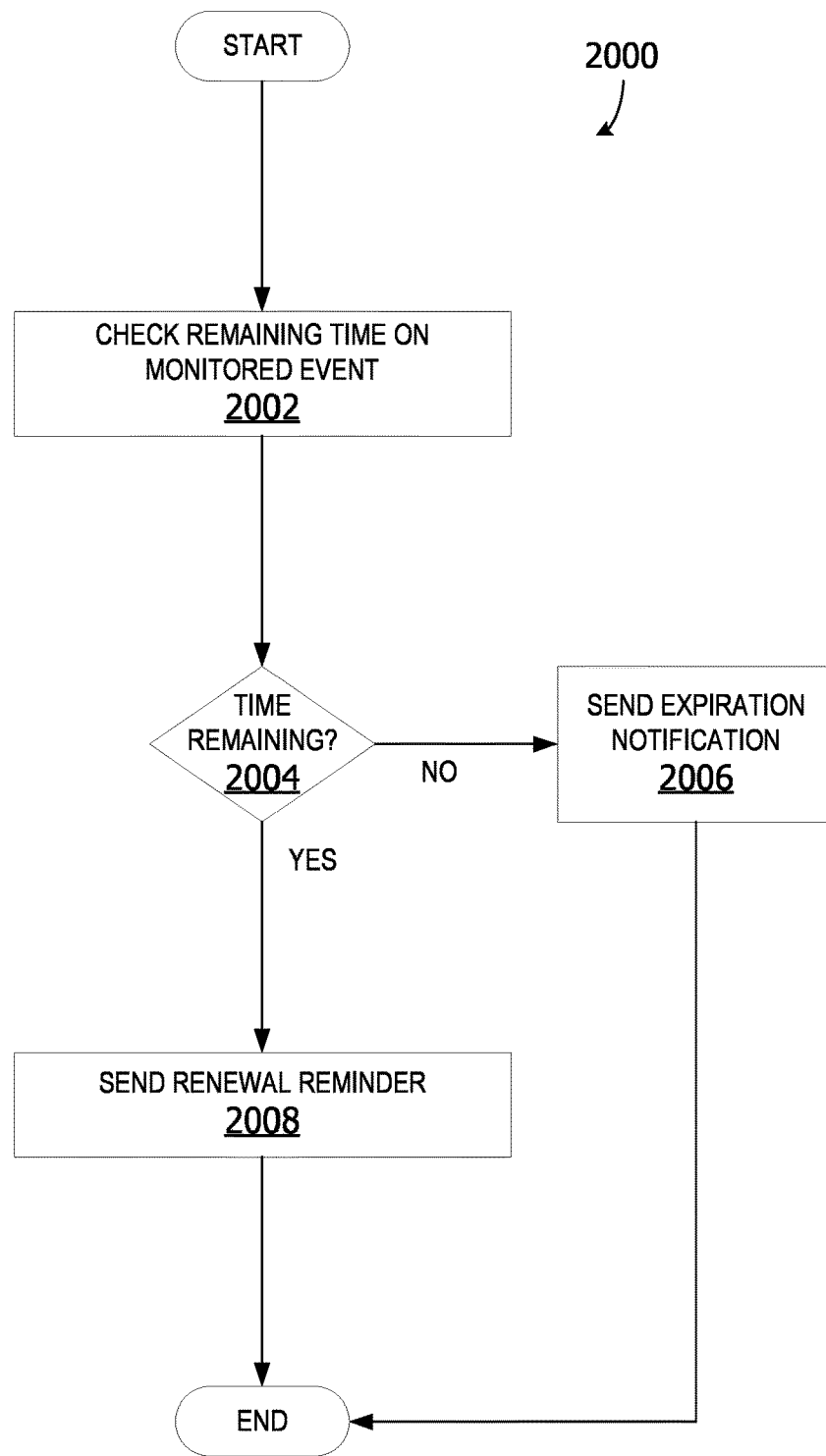
FIG. 20 is an exemplary flow chart illustrating operation of the computing device to generate renewal reminders for monitored events.

FIG. 20 is an exemplary flow chart 2000 illustrating operation of the computing device to generate renewal reminders for monitored events. The process in FIG. 20 is performed by a function manager executing on a computing device, such as, but not limited to, the multifunction siren device 102 in FIG. 1 and/or the user device 126 in FIG. 1.

The process begins by checking the time remaining prior to a due date on a monitored event at 2002. The due date can be any type of date, such as, but not limited to, an expiration date, renewal date and/or other event date. The monitored event is any type of user-selected event having a renewal date, expiration date, or other scheduled event date or time-frame, such as, but not limited to, a warranty expiration, a warranty renewal time-period, a license expiration date, a license renewal time-period, a maintenance due date, a recommended maintenance time-period, etc.

The function manager determines how much time is remaining prior to the event date at 2004. The time remaining is calculated based on a current date and the monitored event date. If there is no time remaining prior to the event date, an expiration notification is sent at 2006. In this example, the notification is sent to a user device for display to the user via a user interface. If there is time remaining prior to the expiration or due date (event date), a renewal reminder is sent at 2008. In some examples, additional reminders are sent periodically until the expiration date is reached. The process terminates thereafter.

Referring now to FIG. 21, an exemplary screenshot illustrating a user login screen 2100 is shown. In this example, a user logs into a portal page or other configuration page provided by a manufacturer or other third party managing the locked function licensing. The portal page is provided in this example via a server, such as, but not limited to, a cloud server, a web server, or any other type of server. In some example, the user log-in accepts a user name and password. In other examples, the log-in is performed using one or more types of biometric data, such as, but not limited to, a fingerprint, facial recognition, etc. In this example, the log-in occurs via a user device connected to the remote computing device (server) via a network connection. Once logged in, the user can access a configuration page (configurator) to select functions for locking and/or unlocking.

In still other examples, the login page includes a "create account" option enabling a user to create a new account. During account creation, the user sets up an account with a user name and password. The user optionally registers one or more siren devices by entering the UID for the device after account creation.

FIG. 22 is an exemplary screenshot illustrating a device status page 2200. In this example, the device status page shows a connected device status indicating whether the multifunction siren device is connected to the user device which is logged into the license managing server, such as, but limited to, the cloud server 128 in FIG. 1 and/or the server 212 in FIG. 2. The device status shows a lock status of a selected function and provides an option for the user to unlock one or more additional siren functions. The multifunction siren device connected to the user device is identified via a unique serial number or other UID. In this non-limiting example, the multifunction siren device is connected to the user device via a USB port.

In this example, the serial number is represented as "XXX," where the variable "X" represents an alphanumeric or other value within the device serial number. However, the serial number is not limited to three values. In other examples, the serial number can include any number of values. In still other examples, the serial number is the UID assigned to the device.

FIG. 23 is an exemplary screenshot illustrating a device status page 2300 showing lock status and history data. In this example, the status page indicates the multifunction siren device is connected to the user device. If the multifunction siren device is not connected, the status page includes a "not connected" or "unconnected device" indication.

In this example, the status page includes a list of available functions and a status indicator showing whether the function is locked or unlocked. However, the examples are not limited to a word indicator that says "locked" or "unlocked." Any type of lock status indicator can be used. For example, the lock status indicator can appear as a check box which is checked or not checked to indicate lock status.

In other examples, the status page includes product information, such as, but not limited to, the name or descriptor of the device, type of device, category of the device, etc. The product information also optionally includes a device serial number or UID, production date (manufacture date), installation date, batch identifier, or any other device-related data.

A history log is optionally provided showing historical data associated with the multifunction siren device. In some examples, the history log includes date when an activity associated with the device occurred. The activity includes date of licensing a function, installation date when the multifunction siren device is installed on a vehicle, manufacture date, maintenance tasks and dates when the maintenance tasks occurred, etc.

FIG. 24 is an exemplary screenshot illustrating a configuration page 2400. The configuration page 2400 in some examples includes an identification of a set of selected functions having a lockable 100 w amplifier or a 200 w amplifier function to be unlocked. In other examples, the functions include a 300 w amplifier function, a 400 w amplifier function, or any other amplifier wattage. The user has selected a siren tone designated as "A1" to test in a demonstration mode. The selected siren tone could include, without limitation, wail, air horn, pulse, pierce, hi-lo, scan, manual, yelp, or any other siren tone.

The demonstration mode is an option to permit the user to hear a demonstration of the selected functions prior to paying a license fee to unlock the selected function(s). The license time is the license time-period for the selected function(s). The amount is the fee to unlock the selected function. If the user chooses to proceed with licensing the selected function, the user can choose a "pay now" button or icon to proceed to a payment page.

FIG. 25 is an exemplary screenshot illustrating a demonstration mode page 2500. The demonstration mode page shows whether the multifunction siren device is connected, the available siren tones which can be heard during testing (wail, air horn and yelp) with the selected 200 w amplifier. If the user chooses to "try now", the multifunction siren device demonstrates each siren tone in the 200 w amplifier function mode regardless of whether those functions are locked if the multifunction siren device is still connected to the user device. The demonstration mode cannot perform the demonstration mode if the multifunction siren device is not connected to the user device.

FIG. 26 is an exemplary screenshot illustrating a configuration page 2600 for unlocking one or more functions on a multifunction siren device. The configuration page in this example presents a license fee amount for unlocking each available function. This enables the user to quickly and easily view license fees based on configurable functions.

FIG. 27 is an exemplary screenshot illustrating a confirmation page 2700 for completing licensing of a locked function on a multifunction siren device. In this non-limiting example, the confirmation page displays the unlock code for the selected function licensed by the user. The unlock code is received from a remote server. The user selects to proceed with unlocking the device. The unlock code enables the unlocked function(s) to operate normally on the multifunction siren device for the duration of the licensed term.

Figure 28:
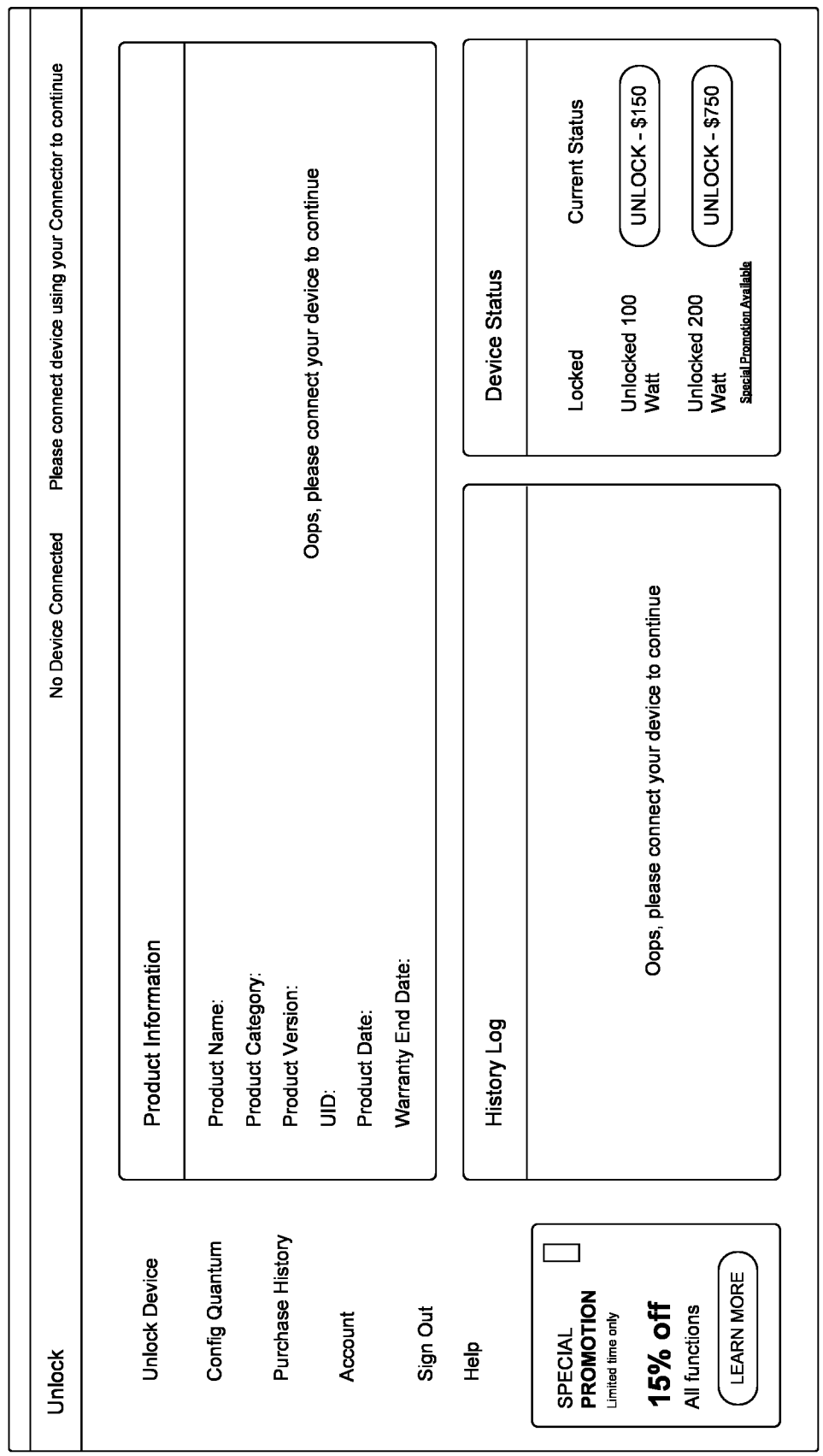
FIG. 28 is an exemplary screenshot illustrating a multifunction siren device configuration page enabling user configuration of a set of lockable functions.

FIG. 28 is an exemplary screenshot illustrating a multifunction siren device configuration page 2800 enabling user configuration of a set of lockable functions. In this non-limiting example, a user can choose to unlock the 100 w amplifier or the 200 w amplifier. A license fee for unlocking each function can optionally be provided.

In some examples, the selected configuration of functions can be referred to as a build. The build can be uploaded for licensing or saved for later consideration or review. In some examples, the configuration page includes device description data, such as, but not limited to, descriptive information describing the siren device.

Additional Examples

In some examples, a multifunction siren device with lockable functions is provided. Customers that want additional functionality connect to a database or remote server to download unlock code(s) enabling additional, user-configurable functions.

In some examples, lockable multifunction siren devices are provided to dealers and/or consumers with a 100 w amplifier unlocked. The multifunction siren devices in these examples are sold at 100 w siren device prices, enabling increased sales volume and greater dealer stock volume where dealers pay less to stock multifunction siren devices. Thus, manufacturers can produce more multifunction siren devices and store less volume where dealers act as an inventory hub. In addition, fewer item outs are experienced as a single type of multifunction siren device is capable of functioning as both a 100 w siren and a 200 w siren.

In still other examples, the lockable functions enable improved customizable functions to service customers faster. In one example, a user connects a multifunction siren device into a user device while logged into a licensing server, such as, but not limited to, the cloud server 128 in FIG. 1 and/or the server 212 in FIG. 2. In this example, the multifunction siren is plugged into a USB port on the multifunction siren device and/or the user device to connect. A UI screen on the user interface indicates whether the device is properly connected. If so, the user is given the option to register/create a login if the user has not previously created an account and/or registered the device. The system presents device data, such as, but not limited to, the device UID or serial number, and status of the device. The status includes a list of functions and lock status of each function. The user can select a locked function for demonstration mode or to unlock (license) the locked function. The user utilizes a payment webpage to purchase a license/unlock code to unlock the selected functions. The status of the newly unlocked functions are updated on the multifunction siren device as well as on the remote device management system (cloud server) or a cloud database.

In other examples, the unlock code is provided to the multifunction siren device via a dongle or other device that plugs into a port on the multifunction siren device. In this example, the unlock code is loaded onto the dongle and then provided to the siren device via the USB or other connection port.

The UID is a unique identification assigned to each multifunction siren device. The UID, in some examples, is stored in the firmware in EPROM or flash memory on the device.

In other examples, the multifunction siren device includes a time function which enables the device to calculate an amount of time which has passed and/or determine when a license expires. In this example, the multifunction siren device remembers a license start date, a license end date, a date of first user, and other information. The multifunction siren device checks the current date and calculates whether the license has run out or is about to run out within a predetermined period of time. In some examples, this event monitoring is performed using GPS or an onboard clock crystal real time clock (RTC) module. The RTC is powered with a battery. In other examples, the RTC can be powered via the vehicle electrical system.

In yet other examples, a user device connects to an online server to access a configurator page. The configurator page is used to select functions on the multifunction siren device which are to be unlocked. In other words, a configurator page is a webpage which enables the user to customize function configurations of each multifunction siren device. This enables the user to configure each device differently for different situations and different types of vehicles. In this manner, the same type of electronic multifunction siren can be configured to operate as a 100 w siren, a 200 w siren, a public address device, a siren, an alarm, a whistle, a horn, a radio re-broadcast, an emergency alert, or any other type of siren. The siren device can be installed on a car, a fire truck, a tow truck, a building, a pole, or any other type of emergency vehicle or structure. This provides increased flexibility and adaptability of siren devices.

In other examples, a remote device manager can initiate a diagnostics process on the multifunction siren device via a network connection. In this example, the OBD is initiated remotely to ensure proper functioning of the multifunction siren device for improved customer convenience while ensuring optimum device function.

Alternatively, or in addition to the other examples described herein, examples include any combination of the following:
- an unlock state of the 100 w amplifier function at a manufacture time, wherein the siren device is operable as a 100 w siren device at the manufacture time, wherein the 200 w amplifier is locked at manufacture;
- a unique identifier (UID) assigned to the siren device, wherein the UID is mapped to device-specific, function-related data associated with the set of available functions;
- a data storage device associated with the siren device, the data storage device storing the status of the set of available functions, including the selected function, wherein the status of the selected function is updated in response to the siren device receiving the unlock code;
- wherein the set of available functions further comprises a set of available siren types, the set of available siren types comprising at least one of a wail, a yelp, a mechanical siren, sting, air horn, public address (PA) and phaser;
- a timer device associated with the siren device, wherein the timer device monitors an amount of remaining time in a predetermined license time-period;
- a demonstration mode of the siren device, wherein the demonstration mode enables at least one function in the set of available functions to operate in a locked state while the sirens device is connected to the user device;
- a diagnostics mode of the siren device, wherein the diagnostics mode performs at least one diagnostic operation on the siren device when activated;
- a set of unlock codes associated with the set of available functions, the set of unlock codes stored on a data storage device on the siren device, wherein a different unlock code is associated with each unlocked function in the set of available functions;
- unlocking the 100 w amplifier strength at manufacture time;
- unlocking the 200 w amplifier strength in response to receiving a first unlock code;
- wherein the set of available functions comprises a set of siren tone functions;
- unlocking a first siren tone functions at manufacture time;
- unlocking a second siren tone functions in response to receiving a first unlock code;
- unlocking a third siren tone functions in response to receiving a second unlock code, wherein the first unlock code is a different code then the second unlock code, and wherein the set of siren types comprises at least one of a wail, yelp, electronic siren, air horn, phaser, and PA;

returning the lock status of the at least one selected function from the unlocked state back to the locked state at a termination of a predetermined license time-period;

monitoring, by a timer device, an amount of remaining time in a predetermined license time-period, wherein a license renewal reminder is generated within a user-selected time-period prior to a license expiration date at an end of the predetermined license time-period;

enabling, during a demonstration mode, a locked function to operate in a locked state while the siren device is connected to the user device;

performing a set of diagnostic tests associated with the at least one function of the siren device;

generating a reminder;

sending the reminder to the user device for viewing by at least one user, the reminder comprising at least one of a warranty expiration reminder, a maintenance due reminder and a license renewal reminder;

disable the 200 w amplifier function in response to a locked status of the 200 w amplifier function, wherein the siren device is operable to function as a 100 w siren device while the 200 w amplifier function is in the locked state;

receive an the unlock code associated with the 200 w amplifier function via a network connection;

enable the 200 w amplifier function to operate normally for the duration of a predetermined license time-period in response to receiving a unique unlock code corresponding to the 200 w amplifier function;

change a lock status of the 200 w amplifier function from a lock state to an unlocked state;

a demonstration mode of the siren device, wherein the demonstration mode enables the 200 w amplifier function to operate while in a locked state to demonstrate normal operation of the 200 w amplifier function prior to a user completing a licensing process to unlock the 200 w amplifier function, wherein the demonstration mode operates while the siren device is connected to the user device;

unlock a first set of siren tone functions at manufacture time;

unlocking a second set of siren tone functions in response to receiving a first unlock code; and unlocking a third set of siren tone functions in response to receiving a second unlock code, wherein the first unlock code is a different code then the second unlock code, and wherein the set of siren tone functions comprises at least one of a wail, yelp, electronic siren, air horn, phaser, and PA.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

In some examples, the operations illustrated in FIG. 16, FIG. 17, FIG. 18, FIG. 19, and FIG. 20 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing lockable functions on a siren device, the method comprising preventing operation of at least one locked function in a set of available functions on a siren device, the set of available functions comprising a 100 w amplifier strength and a 200 w amplifier strength; receiving an the unlock code associated with the at least one locked function via a network connection; enabling the at least one function to operate normally in response to receiving the unlock code; and updating a lock status of the at least one function from a lock state to an unlocked state on a data storage device associated with the siren device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing lockable multifunction siren device functions. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, such as when encoded to perform the operations illustrated in FIG. 16, FIG. 17, FIG. 18, FIG. 19 and FIG. 20, constitute exemplary means for storing, on a multifunction siren device, a list of available functions; exemplary means for receiving an unlock code associated with at least one selected function in the list of available functions; changing a lock status of the at least one selected function from a locked state to an unlocked state in response to receiving the unlock code; and exemplary means for returning the lock status of the at least one selected function from the unlocked state back to the locked state. In some examples, a user manually returns the device to the locked state. In other examples, the function returns automatically to the locked state at a termination of a predetermined license time-period.

Other non-limiting examples provide one or more computer storage devices having a first computer-executable instructions stored thereon for providing a lockable multifunction siren device. When executed by a computer, the computer performs operations including storing, on a multifunction siren device, a list of available functions on the multifunction siren device; receiving, from a user device communicatively coupled to the multifunction siren device, an unlock code associated with at least one selected function in the list of available functions; unlocking the selected function; permitting the selected function to operate normally; changing a lock status of the at least one selected function from a locked state to an unlocked state in response to receiving the unlock code; and returning the lock status of the at least one selected function from the unlocked state back to the locked state at a termination of a predetermined license time-period.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of", or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for lockable emergency vehicle siren device functions, the system comprising:
   a siren device comprising a set of available functions, the set of available functions comprising a first amplifier function and a second amplifier function two-hundred-Watt (200 w) amplifier function, wherein the first amplifier function is a one-hundred-Watt (100 w) amplifier function, and wherein the second amplifier function is an amplifier function have a greater wattage than the first amplifier function;
   a data storage device stores a plurality of available functions and a lock status of each function in the plurality of available functions, the lock status comprising an unlock state or a locked state, the locked state associated with a selected function in the set of available functions indicating the selected function in the locked state is prevented from operating without an unlock code; and
   a processor communicatively coupled to a memory of the siren device, the memory having stored thereon computer-executable instructions causing the processor to:
      enable the selected function to operate normally in response to receiving the unlock code; and
      update the lock status of the selected function from the lock state to the unlocked state on the data storage device on the siren device.

2. The system of claim 1, wherein the second amplifier function is a two-hundred-watt (200 w) amplifier function which is inoperable in a locked state and operable in an unlocked state.

3. The system of claim 1, wherein the set of available functions further comprises at least one of a three-hundred-watt (300 w) amplifier function and a four-hundred-Watt (400 w) amplifier function.

4. The system of claim 1, further comprising:
   a user device communicatively coupled with the siren device, the user device displays the status of the set of available functions via a user interface, the status including the selected function, wherein the status of the selected function is updated in response to the siren device receiving the unlock code.

5. The system of claim 1, wherein the set of available functions further comprises at least one of a set of siren types, the set of siren types comprising at least one of a wail, a yelp, and horn.

6. The system of claim 1, further comprising:
   a timer device associated with the siren device, wherein the timer device monitors an amount of remaining time in a predetermined license time-period.

7. The system of claim 1, further comprising:
   a demonstration mode of the siren device, wherein the demonstration mode enables at least one function in the set of available functions to operate in a locked state while the sirens device is connected to a user device.

8. The system of claim 1, further comprising:
   a diagnostics mode of the siren device, wherein the diagnostics mode performs at least one diagnostic operation on the siren device when activated.

9. The system of claim 1, further comprising:
   a set of unlock codes associated with the set of available functions, the set of unlock codes stored on a data storage device on the siren device, wherein a different unlock code is associated with each unlocked function in the set of available functions.

10. A method for managing lockable functions on an emergency vehicle siren device, the method comprising:
    locking at least one function in a set of available functions on a siren device to prevent normal operation of the at least one function, the set of available functions comprising a first amplifier strength and a second amplifier strength, the second amplifier strength is a greater amplifier strength than the first amplifier strength;
    receiving an unlock code associated with the at least one function in the set of available functions via a network connection;
    enabling the at least one function to operate normally in response to receiving the unlock code; and
    updating a lock status of the at least one function from a lock state to an unlocked state on a data storage device associated with the siren device.

11. The method of claim 10, wherein the unlock code is function-specific, and further comprising:
    unlocking the first amplifier strength in response to receiving a first unlock code; and
    unlocking the second amplifier strength in response to receiving a second unlock code.

12. The method of claim 10, wherein the set of available functions comprises a set of siren tone functions further comprising:
    unlocking a first siren tone functions at manufacture time;
    unlocking a second siren tone functions in response to receiving a first unlock code; and
    unlocking a third siren tone functions in response to receiving a second unlock code, wherein the first unlock code is a different code then the second unlock code.

13. The method of claim 10, wherein the first amplifier strength is a 100 w amplifier strength and wherein the second amplifier strength is a 200 w amplifier strength.

14. The method of claim 10, further comprising:
monitoring, by a timer device, an amount of remaining time in a predetermined license time-period, wherein a license renewal reminder is generated within a user-selected time-period prior to a license expiration date at an end of the predetermined license time-period; and
returning a lock status of a selected function from the unlocked state back to a locked state at a termination of the predetermined license time.

15. The method of claim 10, further comprising:
enabling, during a demonstration mode, a locked function to operate in a locked state while the siren device is connected to a user device.

16. The method of claim 10, further comprising:
performing a set of diagnostic tests associated with at least one function of the siren device.

17. The method of claim 10, further comprising:
generating a reminder; and
sending the reminder to a user device for viewing by at least one user, the reminder comprising at least one of a warranty expiration reminder, a maintenance due reminder and a license renewal reminder.

18. A siren device having lockable functions comprising:
at least one speaker capable of emitting an audible siren sound;
a set of available functions, the set of available functions comprising a 100 w amplifier function and a 200 w amplifier function;
a data storage device storing an assigned UID and a status of each function in the set of available functions, at least one selected function in the set of available functions in a locked state preventing operation of the at least one selected function;
universal serial bus (USB) port that communicatively couples to a user device; and
a processor communicatively coupled to a memory, the memory having stored thereon computer-executable instructions causing the processor to:
disable the 200 w amplifier function in response to a locked status of the 200 w amplifier function, wherein the siren device is operable to function as a 100 w siren device while in an unlocked state, wherein the 200 w amplifier function is in the locked state;
receive an unlock code associated with the 200 w amplifier function via a network connection;
enable the 200 w amplifier function to operate normally for a duration of a predetermined license time-period in response to receiving a unique unlock code corresponding to the 200 w amplifier function; and
change a lock status of the 200 w amplifier function from a lock state to an unlocked state.

19. The siren device of claim 18, further comprising:
a demonstration mode of the siren device, wherein the demonstration mode enables the 200 w amplifier function to operate while in a locked state to demonstrate normal operation of the 200 w amplifier function prior to a user completing a licensing process to unlock the 200 w amplifier function, wherein the demonstration mode operates while the siren device is connected to the user device.

20. The siren device of claim 18, wherein the set of available functions includes a set of siren tone functions, and wherein the computer-executable instructions further cause the processor to:
unlock a first set of siren tone functions at manufacture time;
unlocking a second set of siren tone functions in response to receiving a first unlock code; and
unlocking a third set of siren tone functions in response to receiving a second unlock code, wherein the first unlock code is a different code then the second unlock code.

* * * * *